United States Patent
Ishiguro

(10) Patent No.: US 8,184,818 B2
(45) Date of Patent: May 22, 2012

(54) DOUBLE-TALK DETECTOR WITH ACCURACY AND SPEED OF DETECTION IMPROVED AND A METHOD THEREFOR

(75) Inventor: Takashi Ishiguro, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 972 days.

(21) Appl. No.: 12/219,486

(22) Filed: Jul. 23, 2008

(65) Prior Publication Data

US 2009/0028355 A1 Jan. 29, 2009

(30) Foreign Application Priority Data

Jul. 25, 2007 (JP) ................................. 2007-193625

(51) Int. Cl.
*H04B 3/20* (2006.01)

(52) U.S. Cl. ...................... 381/66; 381/71.4; 379/406.08

(58) Field of Classification Search .................... 381/66, 381/71.4; 379/406.08
See application file for complete search history.

(56) References Cited

U.S. PATENT DOCUMENTS

| | | | | |
|---|---|---|---|---|
| 5,668,794 A * | 9/1997 | McCaslin et al. | ............. | 370/288 |
| 5,668,871 A * | 9/1997 | Urbanski | ................. | 379/406.07 |
| 5,696,821 A * | 12/1997 | Urbanski | ................. | 379/406.07 |
| 6,195,430 B1 * | 2/2001 | Eriksson et al. | ......... | 379/406.05 |
| 6,212,273 B1 * | 4/2001 | Hemkumar et al. | ..... | 379/406.08 |
| 6,269,161 B1 * | 7/2001 | McLaughlin et al. | ... | 379/406.01 |
| 6,282,176 B1 * | 8/2001 | Hemkumar | ................... | 370/276 |
| 6,434,110 B1 * | 8/2002 | Hemkumar | ..................... | 370/201 |
| 6,622,030 B1 * | 9/2003 | Romesburg et al. | .......... | 455/570 |
| 6,744,886 B1 * | 6/2004 | Benesty et al. | .......... | 379/406.08 |
| 6,968,064 B1 * | 11/2005 | Ning | ............................... | 381/66 |
| 7,672,445 B1 * | 3/2010 | Zhang et al. | ............. | 379/406.01 |
| 2008/0175375 A1 * | 7/2008 | Ishiguro et al. | .......... | 379/406.08 |
| 2009/0028355 A1 * | 1/2009 | Ishiguro | .......................... | 381/66 |
| 2011/0033059 A1 * | 2/2011 | Bhaskar et al. | .............. | 381/71.4 |

FOREIGN PATENT DOCUMENTS

| | | |
|---|---|---|
| JP | 63238727 | 10/1988 |
| JP | 2008153993 A * | 7/2008 |
| JP | 2009033344 A * | 2/2009 |

* cited by examiner

*Primary Examiner* — Laura Menz

(74) *Attorney, Agent, or Firm* — Rabin & Berdo, P.C.

(57) ABSTRACT

A double-talk detector finds an estimated power value of near end background noise based on a residual signal by a noise estimator; the average power of a transmitter input signal by a transmitter average power calculator; the average power of a receiver input signal by a receiver average power calculator; and an estimated echo path attenuation value through a predetermined echo path attenuation value estimating process based on the estimated power value of the near end background noise, the average power of the transmitter input signal and the average power of the receiver input signal by an attenuation value estimator. The double-talk detector detects a double-talk state based on the estimated echo path attenuation value, the average power of the transmitter input signal and the average power of the receiver input signal by a double-talk determiner to control update of the coefficient of an adaptive filter.

17 Claims, 9 Drawing Sheets

DOUBLE-TALK DETECTOR WITH ACCURACY AND SPEED OF DETECTION IMPROVED AND A METHOD THEREFOR

BACKGROUND OF THE INVENTION

1. Field of the Invention

The present invention relates to a double-talk detector, and particularly to a double-talk detector applicable to, for example, an echo canceller using an adaptive filter for controlling, i.e. enabling/disabling, the update of the coefficient of the adaptive filter, and to such an echo canceller having the double-talk detector. The present invention also relates to a detection method for such a double-talk detector.

2. Description of the Background Art

Conventionally, a general echo canceller is shown in FIG. 1, to which reference will be made for describing the operation of the conventional echo canceller and a double-talk detector for use therein. The echo canceller includes a pseudo echo generator, a subtractor, and a double-talk detector.

The pseudo echo generator is an adaptive filter having learning function, and generates a pseudo echo signal yr(n) from a receiver input signal x(n) inputted from a receiver input terminal Rin. The pseudo echo generator deals with a residual signal e(n) outputted from a residual output terminal RES as an error caused by a difference in characteristics between the adaptive filter and the echo path transfer to update the coefficient of the adaptive filter so as for the characteristic of the adaptive filter to converge to the characteristic of the echo path transfer.

To the receiver input terminal Rin of the echo canceller, the receiver input signal x(n) is transmitted from a far end talker to be inputted. The receiver input signal x(n) is outputted from a receiver output terminal Rout toward a near end side, and also inputted to the adaptive filter in the pseudo echo generator.

The receiver output terminal Rout outputs the receiver input signal x(n), which is sent to a near end talker through an equivalent circuit of a hybrid circuit having a two-to-four-wire conversion function. In addition, the hybrid circuit includes an echo path, which generates an echo y(n), and outputs this echo to one terminal of an adder. The adder has its other terminal receiving a near end transmitter output signal t(n) transferred from a near end talker. The adder outputs a transmitter input signal d(n) obtained by adding the echo signal component y(n) to the near end transmitter output signal t(n) to a transmitter input terminal Sin of the echo canceller. This relation is represented by an expression (1):

$$d(n)=y(n)+t(n) \quad (1)$$

The subtractor subtracts the pseudo echo signal yr(n) from the transmitter input signal d(n) to output the residual signal e(n). This is represented by an expression (2):

$$e(n)=d(n)-yr(n) \quad (2)$$

The subtractor outputs the residual signal e(n). The residual signal includes a residual echo $\Delta y(n)$ caused by a difference in characteristics between the adaptive filter and the echo path transfer, and the near end transmitter output signal t(n). The residual echo $\Delta y(n)$ is represented by an expression (3):

$$\Delta y(n)=y(n)-yr(n) \quad (3)$$

Now, the expression (1) is substituted for the expression (2) to obtain an expression (4):

$$e(n) = d(n) - yr(n) \quad (4)$$
$$= y(n) + t(n) - yr(n)$$
$$= (y(n) - yr(n)) + t(n)$$

Furthermore, the expression (3) is substituted for the expression (4) to obtain an expression (5):

$$e(n)=\Delta y(n)+t(n) \quad (5)$$

When the receiver input signal x(n) is null, namely x(n)=0, the signal component of the residual signal e(n) includes the near end transmitter output signal t(n) only. Therefore, the adaptive filter needs to disable the update of its adaptive filter coefficient to control itself so as to prevent the coefficient from diverging.

When the receiver input signal x(n) includes an audio or voice signal component, and the near end transmitter output signal t(n) is null, namely t(n)=0, the system is in a single-talk state. At this time, the signal component of the residual signal e(n) includes the residual echo $\Delta y(n)$ only. Therefore, this residual signal e(n) can be considered as an error caused by a difference in characteristics between the adaptive filter and the echo path transfer to preferably update the coefficient of the adaptive filter. This update causes the characteristic of the adaptive filter to converge to the characteristic of the echo path transfer. The adaptive filter in the single-talk state may thus preferably enable the update of its coefficient.

When both the receiver input signal x(n) and the near end transmitter output signal t(n) include an audio or voice signal component, the system is in a double-talk state. At this time, the residual signal e(n) includes the residual echo $\Delta y(n)$ caused by a difference in characteristics between the adaptive filter and the echo path transfer, as well as the near end transmitter output signal t(n). Therefore, the adaptive filter needs to disable the update of its coefficient to control itself so as to prevent the coefficient of the adaptive filter from diverging.

Thus, the double-talk detector monitors the receiver input signal x(n), the transmitter input signal d(n), and the residual signal e(n) to determine a talk state. Thereby, during a null state of receiver input signal x(n) or the double-talk state, the adaptive filter disables the update of its coefficient, and in the single-talk state the adaptive filter enables the update of its coefficient.

A conventional double-talk detection method is disclosed by Japanese Patent Laid-Open Publication No. 238727/1988. This method calculates an echo attenuation value Acoms(n) by subtracting a decibel value corresponding to the signal power of the residual signal e(n) from that corresponding to the signal power of the receiver input signal x(n).

Subsequently, according to a talk state, the echo attenuation value Acoms(n) or a value obtained by adding the echo attenuation value Acoms(n) to a margin γ is integrated to calculate a double-talk detection threshold value TRIM(n). Then, when a value obtained by adding the echo attenuation value Acoms(n) to the margin γ is lower than the double-talk detection threshold value TRIM(n), this method determines the double-talk state. This method, since the near end transmitter output signal t(n) transmitted from a near end talker has an audio signal to increase the signal power of the residual signal e(n)=$\Delta y(n)$+t(n) and to decrease the echo attenuation value Acoms(n), detects this decrease in the echo attenuation value Acoms(n) to determine the double-talk state.

Next, the double-talk detection method disclosed by the Japanese '727 Publication will be described briefly. When the signal power of the receiver input signal x(n) is lower than a threshold value XTH to have no audio signal, this method disables the update of coefficient of the adaptive filter, and keep the double-talk detection threshold value TRIM(n) holding the preceding value.

In addition, when the signal power of the receiver input signal x(n) is equal to or more than the threshold value XTH to have an audio signal, and the signal power of the transmitter input signal d(n) is lower than a threshold value YTH to have no audio signal, this method enables the update of coefficient of the adaptive filter, and rapidly decrease the double-talk detection threshold value TRIM(n).

When the signal power of the receiver input signal x(n) is equal to or higher than the threshold value XTH to have an audio signal, and the signal power of the transmitter input signal d(n) is equal to or higher than the threshold value YTH to have an audio signal also, the echo attenuation value Acoms(n) is added to the margin γ to compare the resulting value with the double-talk detection threshold value TRIM(n).

Then, when a value obtained by adding the echo attenuation value Acoms(n) to the margin γ is larger than the double-talk detection threshold value TRIM(n), this method determines a single-talk state to enable the update of coefficient of the adaptive filter and to update the double-talk detection threshold value TRIM(n). The double-talk detection threshold value TRIM(n) is updated through an expression (6):

$$TRIM(n+1) = Acoms(n) \times \delta 1 + TRIM(n) \times (1-\delta 1), \quad (6)$$

where TRIM(n) is a double-talk detection threshold value, Acoms(n) is an echo attenuation value, and δ1 is a coefficient defining the transient response of an integral process. Therefore, when the single-talk state continues, the double-talk detection threshold value TRIM(n) is rendered equal to a value obtained by integrating the echo attenuation value Acoms(n).

In addition, when the value obtained by adding the echo attenuation value Acoms(n) to the margin γ is lower than the double-talk detection threshold value TRIM(n), this method determines a double-talk state to disable the update of coefficient of the adaptive filter and to update the double-talk detection threshold value TRIM(n). The double-talk detection threshold value TRIM(n) is updated through an expression (7):

$$\begin{aligned} TRIM(n+1) &= TRIM(n) - \{TRIM(n) - FLG(n)\} \times \delta 2 \quad (7) \\ &= TRIM(n) - TRIM(n) \times \delta 2 + FLG(n) \times \delta 2 \\ &= FLG(n) \times \delta 2 + TRIM(n) \times (1-\delta 2) \\ &= (Acoms(n) + \gamma) \times \delta 2 + TRIM(n) \times (1-\delta 2), \end{aligned}$$

where TRIM(n) is a double-talk detection threshold value, Acoms(n) is an echo attenuation value, δ2 is a coefficient defining the transient response of an integral process, γ is a margin, and FLG(n) is equal to the Acoms(n) plus the margin γ. Therefore, when the double-talk state continues, the double-talk detection threshold value TRIM(n) is rendered equal to a value obtained by adding the echo attenuation value Acoms(n) to the margin γ to integrate the resulting value.

As described above, the conventional double-talk detection method, when the signal power of the receiver input signal x(n) is equal to or higher than the threshold value XTH to have an audio signal, and the signal power of the transmitter input signal d(n) is equal to or higher than the threshold value YTH to have an audio signal, a decibel value corresponding to the signal power of the residual signal e(n) is subtracted from a decibel value corresponding to the signal power of the receiver input signal x(n) to obtain the echo attenuation value Acoms(n), which is processed to detect a double-talk detection.

However, the above-described echo attenuation value Acoms(n) may be changed depending on a talk state, the power of the near end background noise, and the degree of convergence of the adaptive filter, without changing in an echo path transfer characteristic. Therefore, the conventional double-talk detection is affected by a talk state, the power of the near end background noise, and the degree of convergence of the adaptive filter, which is problematic.

Now, affection of a talk state, the power of the near end background noise, and the degree of convergence of the adaptive filter to the conventional double-talk detection will be described below.

(1) Affection of a Talk State to the Double-Talk Detection

The double-talk state has a residual signal e(n)(=Δy(n)+t(n)) including a near end transmitter output signal t(n). Therefore, the double-talk state has the increasing signal power of the residual signal e(n) and the decreasing echo attenuation value Acoms(n). At this time, as described in connection with the expression (7), since a value obtained by adding the echo attenuation value Acoms(n) to the margin γ is integrated, the double-talk detection threshold value TRIM(n) decreases.

The double-talk detection threshold value TRIM(n) is smaller in the double-talk state than that before the double-talk state.

(2) Affection of the Power of the Near End Background Noise to the Double-Talk Detection Even when only a far end talker speaks in the single-talk state, a near end transmitter output signal t(n) transmitted from the near end generally is not completely null but includes a small signal component, or the near end background noise. Therefore, the transmitter input signal d(n) and the residual signal e(n) (=Δy(n)+t(n)) also include the near end background noise.

For example, it is assumed that the adaptive filter adequately eliminates an echo, namely Δy(n)≈0. At this time, when the near end background noise of the near end transmitter output signal t(n) is almost null, the residual signal e(n) (=Δy(n)+t(n)) is almost null so that the echo attenuation value Acoms(n) and the double-talk detection threshold value TRIM(n) increase.

By contrast, when the power of near end background noise of the near end transmitter output signal t(n) increases, the signal power of the residual signal e(n)(=Δy(n)+t(n)) increases so that the echo attenuation value Acoms(n) and the double-talk detection threshold value TRIM(n) decrease.

In other words, when the near end background noise of the near end transmitter output signal t(n) increases, the double-talk detection threshold value TRIM(n) decreases.

(3) Affection of the Degree of Convergence of the Adaptive Filter to the Double-Talk Detection Depending on the degree of convergence of the adaptive filter, the signal power of the residual signal e(n) and the echo attenuation value Acoms(n) change.

It is assumed that, when the near end background noise is almost null and only the far end talker speaks with the coefficient of the adaptive filter converging, the near end transmitter output signal t(n) transmitted from the near end talker has an impulse signal involved. Then, it is also assumed that the coefficient of the adaptive filter, once converging, diverges.

In this state, since the coefficient of the adaptive filter has converged before applying the impulse signal, the residual echo Δy(n) is almost equal to zero. The signal power of the residual signal e(n)(=Δy(n)+t(n)) decreases, and the echo attenuation value Acoms(n) increases. This results in increasing the double-talk detection threshold value TRIM(n).

On the other hand, right after applying the impulse signal, with the divergence of coefficient of the adaptive filter, the signal power of the residual echo Δy(n) increases rapidly, the signal power of the residual signal e(n) increases, and the echo attenuation value Acoms(n) decreases. However, the double-talk detection threshold value TRIM(n), since calculated by an integral process, hardly changes and keeps its large value.

In this case, whereas the single-talk state stays in fact immediately after applying the impulse signal, a double-talk state may be erroneously determined. When determined to be a double-talk wrongly, the double-talk detection threshold value TRIM(n) gradually decreases. Over time, a single-talk is determined though. However, in spite of the single-talk state and the adaptive filter coefficient divergent, the update of coefficient of the adaptive filter is kept stopping for a long period of time. During this period of time, the residual echo Δy(n) is left to be large, which may cause the far end talker to hear the echo.

As described above, the conventional double-talk detector is affected by a talk state, the power of the near end background noise, and the degree of convergence of the adaptive filter to decrease the accuracy of double-talk detection, which is problematic.

SUMMARY OF THE INVENTION

It is therefore an object of the present invention to provide a double-talk detector capable of improving the accuracy and speed of a double-talk detection, and a detection method therefor.

A double-talk detector in accordance with the present invention for detecting a double-talk state based on a receiver input signal, a transmitter input signal and a residual signal after eliminating an echo in an echo canceller including an adaptive filter having a filter coefficient to control the update of the coefficient includes a noise estimator for finding an estimated power value of near end background noise based on the residual signal; a first transmitter average power calculator for finding an average power value of the transmitter input signal; a first receiver average power calculator for finding an average power value of the receiver input signal; an attenuation value estimator for finding an estimated echo path attenuation value through a predetermined echo path attenuation value estimating process based on an estimated power value of the near end background noise, the average power value of the transmitter input signal and the average power value of the receiver input signal; and a double-talk determiner for detecting a double-talk state based on the estimated echo path attenuation value, the average power value of the transmitter input signal and the average power value of the receiver input signal to control the update of the coefficient.

In accordance with the present invention, a double-talk detector finds an estimated power value of near end background noise based on a residual signal by a noise estimator; finds an average power value of a transmitter input signal by a first transmitter average power calculator; finds an average power value of a receiver input signal by a first receiver average power calculator; finds an estimated echo path attenuation value through a predetermined echo path attenuation value estimating process based on the estimated power value of the near end background noise, the average power value of the transmitter input signal and the average power value of the receiver input signal by an attenuation value estimator; detects a double-talk state based on the estimated echo path attenuation value, the average power value of the transmitter input signal and the average power value of the receiver input signal by a double-talk determiner to control the update of a coefficient of the adaptive filter, thereby estimating an echo path attenuation value accurately to improve the accuracy and speed of detection of the double-talk.

In addition, a double-talk detection method in accordance with the present invention for detecting a double-talk state based on a receiver input signal, a transmitter input signal and a residual signal after eliminating an echo in an echo canceller including an adaptive filter having a filter coefficient to control the update of the coefficient includes the steps of finding an estimated power value of near end background noise based on the residual signal; finding an average power value of a transmitter input signal; finding an average power value of a receiver input signal; finding an estimated echo path attenuation value through a predetermined echo path attenuation value estimating process based on the estimated power value of the near end background noise, the average power value of the transmitter input signal and the average power value of the receiver input signal; and detecting a double-talk state based on the estimated echo path attenuation value, the average power value of the transmitter input signal and the average power value of the receiver input signal to control the update of the coefficient.

In accordance with the present invention, a double-talk detection method finds an estimated power value of near end background noise based on a residual signal; next finds an average power value of a transmitter input signal; finds an average power value of a receiver input signal; finds an estimated echo path attenuation value through a predetermined echo path attenuation value estimating process based on the estimated power value of the near end background noise, the average power value of the transmitter input signal and the average power value of the receiver input signal; detects a double-talk state based on the estimated echo path attenuation value, the average power value of the transmitter input signal and the average power value of the receiver input signal to control the update of the coefficient of the adaptive filter, thereby estimating an echo path attenuation value accurately to improve the accuracy and speed of detection of the double-talk.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 2:
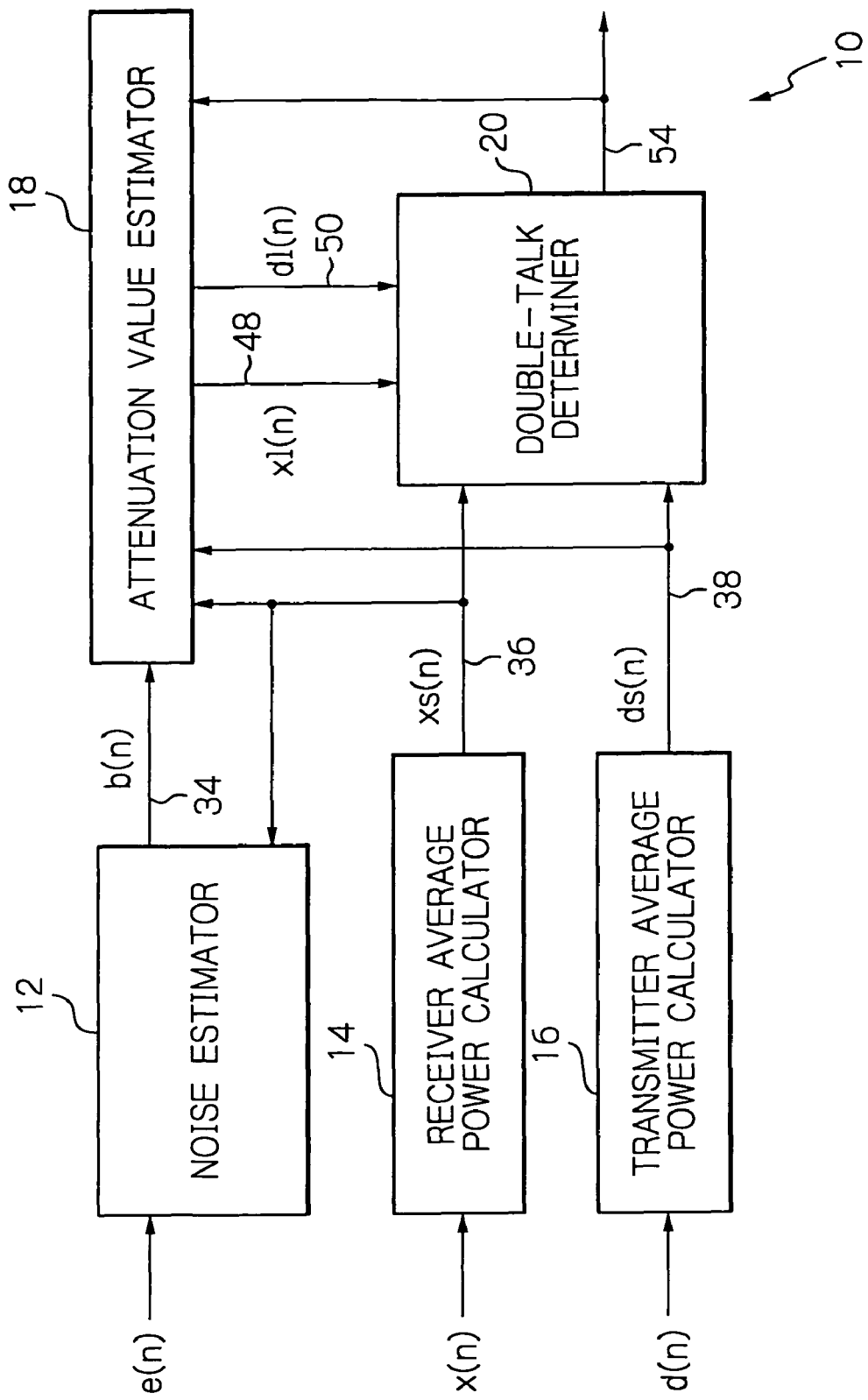
FIG. 2 is a schematic block diagram showing a configuration of an embodiment of a double-talk detector to which the present invention is applied.

Well, reference will be made to accompanying drawings to describe a double-talk detector in accordance with preferred embodiments of the present invention. With reference to FIG. 2, a double-talk detector 10 in accordance with a preferred embodiment of the present invention is adapted to find an estimated power value of near end background noise based on a residual signal by a noise estimator 12; to find an average power value of a transmitter input signal by a transmitter average power calculator 16; to find an average power value of a receiver input signal by a receiver average power calculator 14; to find an estimated echo path attenuation value through an echo path attenuation value estimating process based on the estimated power value of the near end background noise, the average power value of the transmitter input signal and the average power value of the receiver input signal by an attenuation value estimator 18; and to detect a double-talk state based on the estimated echo path attenuation value, the average power value of the transmitter input signal and the average power value of the receiver input signal by a double-talk determiner 20 to control the update of coefficient of the adaptive filter, thereby estimating an echo path attenuation value accurately so as to improve the accuracy and speed of detection of the double-talk.

Figure 1:
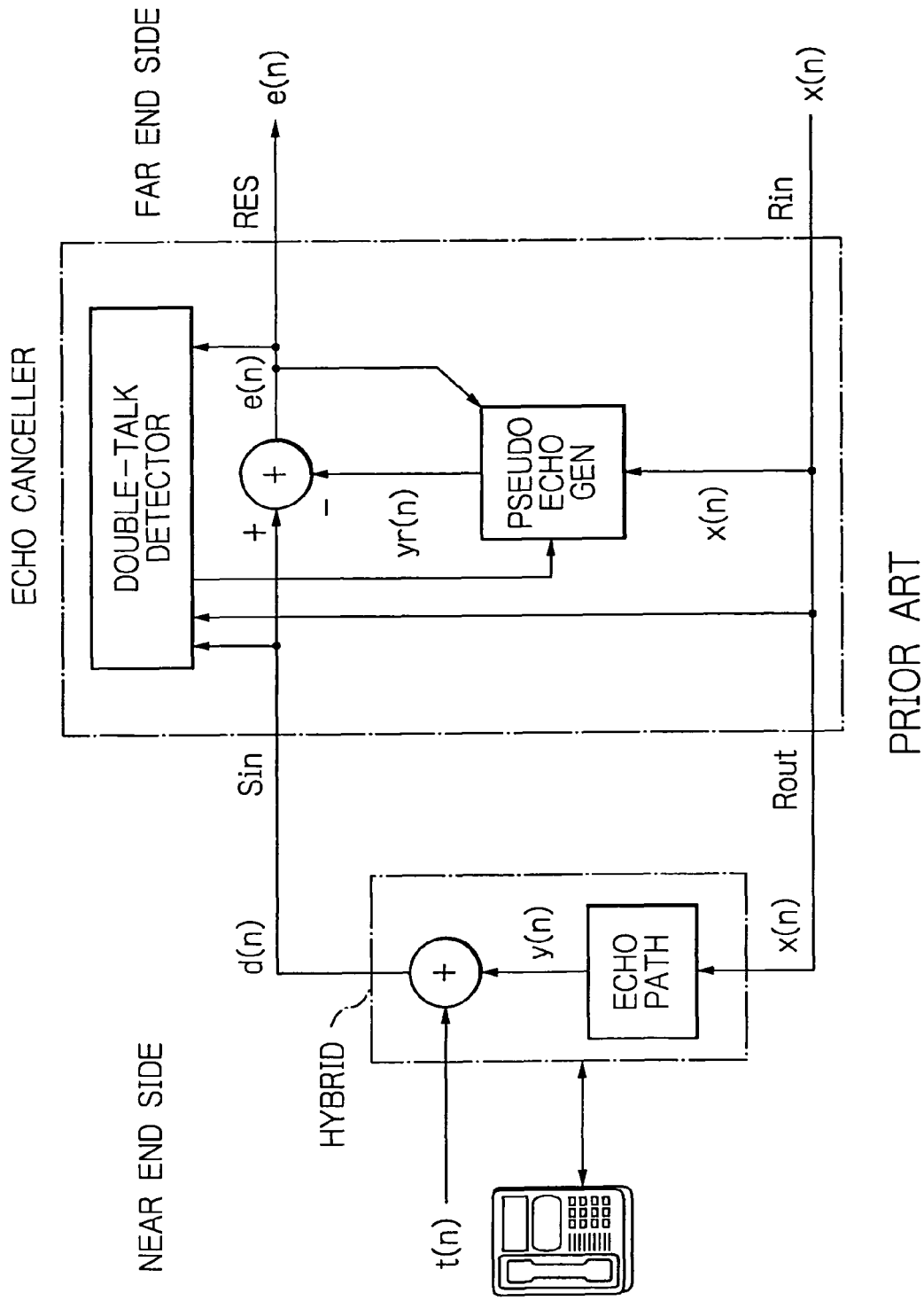
FIG. 1 is a schematic block diagram showing a configuration of a conventional echo canceller.

The instant illustrative embodiment is directed to the double-talk detector 10 to which the present invention is applied. Elements or portions not directly relevant to understanding the present invention will neither be described nor shown. In the description, signals are designated with reference numerals for connection lines on which they appear. For example, with reference to FIG. 2, the double-talk detector 10 is interconnected to receive the signals e(n), x(n) and d(n), such as shown in FIG. 1, to produce a control signal 54 for enabling or disabling the update of an adaptive filter coefficient.

The double-talk detector 10, as shown in FIG. 2, includes the noise estimator 12, the transmitter average power calculator 16, the receiver average power calculator 14, the attenuation value estimator 18, and the double-talk determiner 20, which are interconnected as illustrated.

The noise estimator 12 has a function to receive the residual signal e(n) and estimate the near end background noise power in a near end transmitter output signal t(n) transmitted from a near end talker. The noise estimator 12 functions when a short-term average power xs(n) of a receiver input signal x(n) from the receiver average power calculator 14 described below is lower than a threshold value xs_th, i.e. in the condition of no sound of a far end talker. The noise estimator 12, in this condition, averages the absolute value |e(n)| of a sampled value of the residual signal e(n) to estimate the near end background noise power.

Now, the threshold value xs_th may not particularly be limited. However, for example, a value of −40 dBm is applied preferably.

Figure 3:
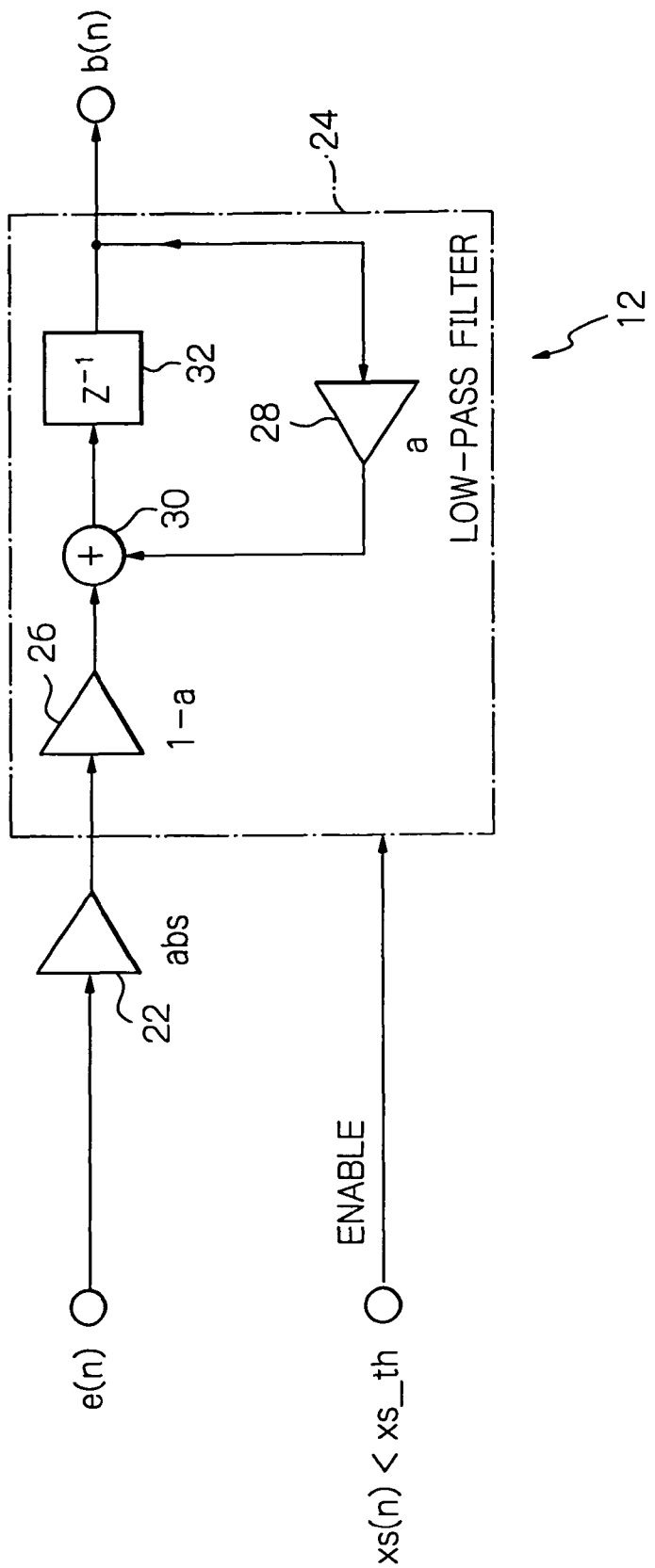
FIG. 3 is a schematic block diagram showing a configuration of a noise estimator shown in FIG. 2.

FIG. 3 shows the components of the noise estimator 12. The noise estimator 12, as shown in the figure, includes an absolute value calculator 22 and a low-pass filter 24. The low-pass filter 24 is an IIR (Infinite Impulse Response) type of low-pass filter (LPF) having an adequate time constant, and includes multipliers 26 and 28, an adder 30, and a delay element 32 which are interconnected as shown. The low-pass filter 24 is used for an averaging process. The time constant of the low-pass filter may be, for example, 200 ms preferably.

In the low-pass filter 24, when the coefficient of the one multiplier 28 is set to a value representative of "a", the coefficient of the other multiplier 26 is set to a complementary value representative of "1−a". The coefficient "a" is defined where a=exp(−T/CR). Now, the coefficient is defined by the variable T indicating a sampling interval of the IIR filter and the variable CR indicating the time constant.

Meanwhile, this embodiment uses an IIR-type low-pass filter. However, the present invention is not restricted to such a specific example, but any types of circuit may be applied so far as they are capable of averaging.

The noise estimator 12 uses an expression (8):

$$b(n)=|e(n)|\times(1-a)+b(n-1)\times a \qquad (8)$$

to estimate the estimated near end background noise power b(n)

The noise estimator 12, when the receiver average power xs(n) is lower than the threshold value xs_th, performs the expression (8) to output and update the estimated near end background noise power b(n) 34 to the attenuation value estimator 18. Otherwise, the estimated near end background noise power b(n) 34 holds its preceding value (b(n)=b(n−1)) to be outputted to the attenuation value estimator 18 and updated.

It is noted that the near end background noise is estimated by using not the transmitter input signal d(n)(=y(n)+t(n)) but the residual signal e(n)(=Δy(n)+t(n)). Because, even when the short-term average power xs(n) of the receiver input signal is lower than the threshold value xs_th, the transmitter input signal d(n) may include an echo signal component y(n). Accordingly, in order to minimize the influence of the echo, the residual signal e(n)(=Δy(n)+t(n)) is used as the output of an echo canceller.

The receiver average power calculator 14 has a function to receive the receiver input signal x(n) and calculate the average signal power of the receiver input signal for a predetermined short period of time. The receiver average power calculator 14 supplies the calculated short-term average power xs(n) 36 to the noise estimator 12, the attenuation value estimator 18, and the double-talk determiner 20.

The transmitter average power calculator 16 has a function to receive the transmitter input signal d(n) and calculate the average signal power of the transmitter input signal for a predetermined short period of time. The transmitter average power calculator 16 supplies the calculated short-term average power ds(n) 38 to the attenuation value estimator 18, and the double-talk determiner 20.

The receiver average power calculator 14 and the transmitter average power calculator 16 always function for calculation. In the illustrative embodiment, the receiver average power calculator 14 and the transmitter average power calculator 16 may include the same components as the noise estimator 12 shown in FIG. 3. The receiver average power calculator 14 and the transmitter average power calculator 16 use the low-pass filter 24 having a filter coefficient different from the above-described value. The receiver and the transmitter average power calculator 14 and 16 receive the absolute values |x(n)| and |d(n)| of sampled values of the receiver and transmitter input signal x(n) and d(n), respectively, to IIR-type low-pass filters having a proper time constant. Thereby, these values are averaged to calculate the short-term average power xs(n) and ds(n), respectively.

The coefficients of the IIR-type low-pass filter are represented as "a_s" and "1−a_s". The coefficient a_s is defined where a_s=exp(−T/CR_s).

Now, the variable T indicates a sampling interval of the IIR filter and the variable CR_s indicates the time constant of the short-term receiver and transmitter average power calculator 14 and 16.

The receiver average power calculator 14 uses an expression (9):

$$xs(n)=|x(n)|\times(1-a\_s)+xs(n-1)\times a\_s \quad (9)$$

to calculate the short-term receiver average power xs(n) 36.

The transmitter average power calculator 16 also uses an expression (10):

$$ds(n)=|d(n)|\times(1-a\_s)+ds(n-1)\times a\_s \quad (10)$$

to calculate the short-term transmitter average power ds(n) 38.

The attenuation value estimator 18 has a function to estimate the attenuation value (ERL: Echo Return Loss) of echo signal of a hybrid circuit, or the echo path, which is the attenuation value in signal power of the echo y(n) as an echo path output to that of the receiver input signal x(n) as an echo path input.

Figure 4:
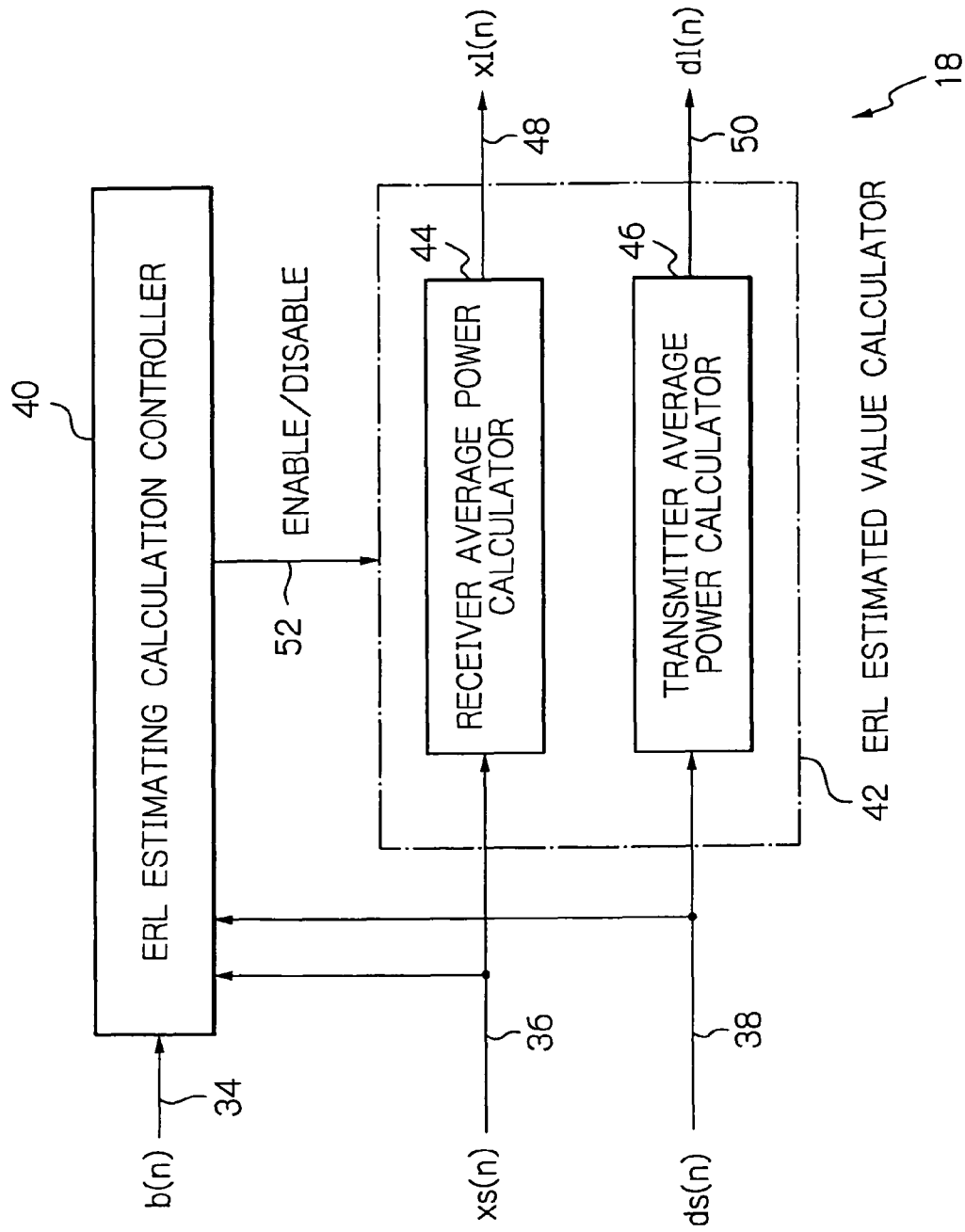
FIG. 4 is a schematic block diagram showing a configuration of an attenuation value estimator shown in FIG. 2.

The attenuation value estimator 18, as shown in FIG. 4, includes an ERL estimating calculation controller 40 and an ERL estimated value calculator 42. The ERL estimated value calculator 42 includes the receiver and transmitter average power calculators 44 and 46, which are interconnected as depicted.

The receiver average power calculator 44 has a function to receive the short-term average power xs(n) of the receiver input signal x(n) to calculate a long-term average power xl(n) of the receiver input signal for a predetermined long period of time. The transmitter average power calculator 46 has a function to receive the short-term average power ds(n) of the transmitter input signal d(n) to calculate a long-term average power dl(n) of the transmitter input signal for a predetermined long period of time.

Now, the receiver and transmitter average power calculators 44 and 46 calculate only while a control signal 52 from the below-described ERL estimating calculation controller 40 indicates "Enable". While the control signal 52 indicates "Disable", the preceding value is held as the result of the calculation. The ERL estimated value calculator 42 supplies the calculated long-term average power xl(n) 48 and dl(n) 50 to the double-talk determiner 20.

In the illustrative embodiment, the receiver and transmitter average power calculators 44 and 46 may sufficiently include the components included in the noise estimator 12 shown in FIG. 3 other than the absolute value calculator 22, or only the IIR-type low-pass filter 24. Certainly, the filter coefficient used for the IIR-type low-pass filter 24 is modified properly. In this embodiment, the absolute value calculator 22 is omitted since the input signals to the receiver and transmitter average power calculators 44 and 46 are always of positive values to be averaged for a long period of time.

The receiver and transmitter average power calculators 44 and 46 input the short-term average power xs(n) 36 and ds(n) 38 of the receiver and transmitter input signals, respectively, to the IIR-type low-pass filter having a proper time constant. Thereby, these values are averaged to calculate the long-term average power xl(n) and dl(n). The coefficients of the IIR-type low-pass filter are selected in response to the result of the double-talk determination.

For example, when the result of the double-talk determination shows single-talk, the coefficients of the IIR-type low-pass filters of the receiver and transmitter average power calculators 44 and 46 are "a_st" and "1−a_st". This coefficient a_st is defined where a_st=exp(−T/CR_st). The variable T indicates a sampling interval of the IIR filter and the variable CR_st indicates the time constant of the long-term receiver and transmitter average power calculator 44 and 46 in the case of single-talk determination.

In the case of single-talk determination, the receiver average power calculator 44 uses an expression (11):

$$xl(n)=xs(n)\times(1-a\_st)+xl(n-1)\times a\_st \quad (11)$$

to calculate the long-term average power xl(n).

In the case of single-talk determination, the transmitter average power calculator 46 uses an expression (12):

$$dl(n)=ds(n)\times(1-a\_st)+dl(n-1)\times a\_st \quad (12)$$

to calculate the long-term average power dl(n).

Furthermore, for example, when the result of the double-talk determination shows double-talk, the coefficients of the IIR-type low-pass filters of the receiver and transmitter average power calculators 44 and 46 are "a_dt" and "1−a_dt". This coefficient a_dt is defined where a_dt=exp(−T/CR_dt). The variable T indicates a sampling interval of the IIR filter and the variable CR_dt indicates the time constant of the long-term receiver and transmitter average power calculator 44 and 46 in the case of double-talk determination.

In the case of double-talk determination, the receiver average power calculator 44 uses an expression (13):

$$xl(n)=xs(n)\times(1-a\_dt)+xl(n-1)\times a\_dt \quad (13)$$

to calculate the long-term average power xl(n).

In the case of double-talk determination, the transmitter average power calculator 46 uses an expression (14):

$$dl(n)=ds(n)\times(1-a\_dt)+dl(n-1)\times a\_dt \quad (14)$$

to calculate the long-term average power dl(n).

Now, the time constant CR_dt of the IIR-type low-pass filter in the case of double-talk determination is larger than that in the case of single-talk determination to blunt the response sensitivities of the receiver and transmitter average power calculators 44 and 46 in the case of double-talk determination. Thereby, in the case of double-talk determination, an ERL estimated value can be prevented from decreasing extremely.

The ERL estimating calculation controller 40 has a function to receive the estimated near end background noise power b(n), and the short-term average power xs(n) and ds(n) of the receiver and transmitter input signals to control the enabling of an ERL estimating calculation.

The ERL estimating calculation controller 40 controls to enable the ERL estimating calculation to only when all the following three conditions are satisfied.

(Condition 1)

The short-term average power xs(n) of the receiver input signal is equal to or higher than the threshold value xs_th. Because, the ERL estimating calculation of the echo path requires the receiver input signal x(n) having a signal power equal to or higher than a certain level.

(Condition 2)

In a system condition using an echo canceller, when the minimum value ERL_min of the echo path attenuation value is known, a value obtained by subtracting a decibel value corresponding to the short-term average power ds(n) of the transmitter input signal from that to the short-term average power xs(n) of the receiver input signal is equal to or higher than ERL_min.

Condition 2 may be satisfied, for example, when an expression (15):

$$20 \times \log_{10}(xs(n)) - 20 \times \log_{10}(ds(n)) > ERL\_min \quad (15)$$

is satisfied.

Furthermore, in this embodiment, the expression (15) is converted in order to reduce the calculation amount. From a relation $xs(n)/ds(n) > 10^{ERL\_min/20}$, an expression (16):

$$xs(n) > ds(n) \times 10^{ERL\_min/20} \quad (16)$$

is used.

For example, if it is known that the minimum value ERL_min=6 dB ($10^{ERL\_min/20}=2$) of the echo path attenuation value, the condition for enabling the ERL estimating calculation is that the short-term average power xs(n) of the receiver input signal is twice as high as the short-term average power ds(n) of the transmitter input signal or more.

Condition 2 is used to thereby stop the ERL estimating calculation in the case of undoubted double-talk state, which can prevent the ERL estimated value from being calculated which would otherwise be lower than the actual echo path attenuation value due to the effects of an audio signal of a near end talker.

(Condition 3)

A value obtained by subtracting a decibel value corresponding to the estimated near end background noise power b(n) from that to the short-term average power ds(n) of the transmitter input signal is equal to or higher than a threshold value ϵ.

Condition 3 may be satisfied, for example, when an expression (17):

$$20 \times \log_{10}(ds(n)) - 20 \times \log_{10}(b(n)) > \epsilon \quad (17)$$

is satisfied.

In order to reduce the calculation amount in this embodiment, the expression (17) is converted. From a relation $ds(n)/b(n) > 10^{\epsilon/20}$, an expression (18):

$$ds(n) > b(n) \times 10^{\epsilon/20} \quad (18)$$

is used.

Now, if the threshold value ϵ=6 dB ($10^{\epsilon/20}=2$) is set, the condition for enabling the ERL estimating calculation is that the short-term average power ds(n) of the transmitter input signal is more than twice the estimated near end background noise power b(n).

When the signal power of the echo signal component y(n) included in the transmitter input signal d(n) is smaller than that of the near end background noise, it is difficult to calculate the ERL estimation to accurately estimate the echo path attenuation value. Therefore, only when the signal power of the echo signal component y(n) included in the transmitter input signal d(n) is equal to a certain level or higher than the estimated near end background noise power b(n), the calculation of the ERL estimation can improve the accuracy of the ERL estimation.

As described above, the ERL estimating calculation controller 40, only when all the above three conditions are satisfied, enables the calculation process by the ERL estimated value calculator 42. Then, the ERL estimated value calculator 42 in the case of single-talk determination calculates the long-term average power xl(n) of the receiver input signal and the long-term average power dl(n) of the transmitter input signal according to the expressions (11) and (12). In addition, the ERL estimated value calculator 42 in the case of double-talk determination calculates the long-term average power xl(n) of the receiver input signal and the long-term average power dl(n) of the transmitter input signal according to the expressions (13) and (14).

The ERL estimated value, as defined by an expression (19):

$$ERL = 20 \times \log_{10}(xl(n)) - 20 \times \log_{10}(dl(n)) \quad (19)$$

can be calculated by subtracting a decibel value corresponding to the long-term average power dl(n) of the transmitter input signal from that to the long-term average power xl(n) of the receiver input signal.

In order to reduce the calculation amount in this embodiment, the calculation of the expression (19) is not performed, but the long-term average power dl(n) and xl(n) of the transmitter and receiver input signals are sent to the double-talk determiner 20 without modification.

It is noted that the ERL estimating calculation controller 40, even when the result of the double-talk determination is double-talk, controls to enable the ERL estimating calculation if these three conditions are satisfied. Because, just after, for example, a change in the characteristic of the echo path causes the echo path attenuation value to change, the single-talk state may be determined to be the double-talk state wrongly. Since this enables the ERL estimating calculation, the ERL estimated value can follow the echo path attenuation value after the echo path has changed.

However, since the time constant CR_dt of the receiver and transmitter average power calculators 44 and 46 in the case of double-talk determination is larger than that in the case of single-talk determination, the response sensitivities of the receiver and transmitter average power calculators 44 and 46 are blunt in the case of double-talk determination. Thereby, the ERL estimated value can be prevented from decreasing extremely due to the effects of an audio signal of a near end talker in the case of double-talk determination.

The double-talk determiner 20 has a function to receive the short-term and long-term average powers xs(n) and xl(n) of the receiver input signal and the short-term and long-term average power ds(n) and dl(n) of the transmitter input signal, detect the double-talk, and generate a control signal for controlling the update of coefficient of the adaptive filter, that is an "Enable/Disable" signal 54.

The double-talk determiner 20 detects the double-talk according to the following Steps 1, 2 and 3.

(Step 1)

First, when the short-term average power xs(n) of the receiver input signal is lower than the threshold value xs_th, the update of coefficient of the adaptive filter is disabled so as not to perform the subsequent steps.

(Step 2)

Next, when a value calculated by subtracting a decibel value corresponding to the short-term average power ds(n) of the transmitter input signal from that to the short-term average power xs(n) of the receiver input signal and adding a margin a is larger than the ERL estimated value, it is determined to be the single-talk state to enable the update of coefficient of the adaptive filter. The margin a is set to, for example, 3 dB. This condition is represented by an expression (20):

$$20 \times \log_{10}(xs(n)) - 20 \times \log_{10}(ds(n)) + \alpha > ERL \quad (20)$$

In order to explain a double-talk determination threshold value described below, the expression (20) is converted to obtain an expression (21):

$$20 \times \log_{10}(xs(n)) - ERL + \alpha > 20 \times \log_{10}(ds(n)) \quad (21)$$

(Step 3)

When either Step 1 or 2 is not applicable, the double-talk determiner 20 determines the double-talk state to disable the update of coefficient of the adaptive filter.

Next, reference to FIG. 5 will be made which shows the characteristic of the double-talk determination threshold value in this embodiment. In the figure, the vertical and horizontal axes represent the short-term average power ds(n) [dBm] and xs(n) [dBm] of the transmitter and receiver input signals, respectively.

Figure 5:
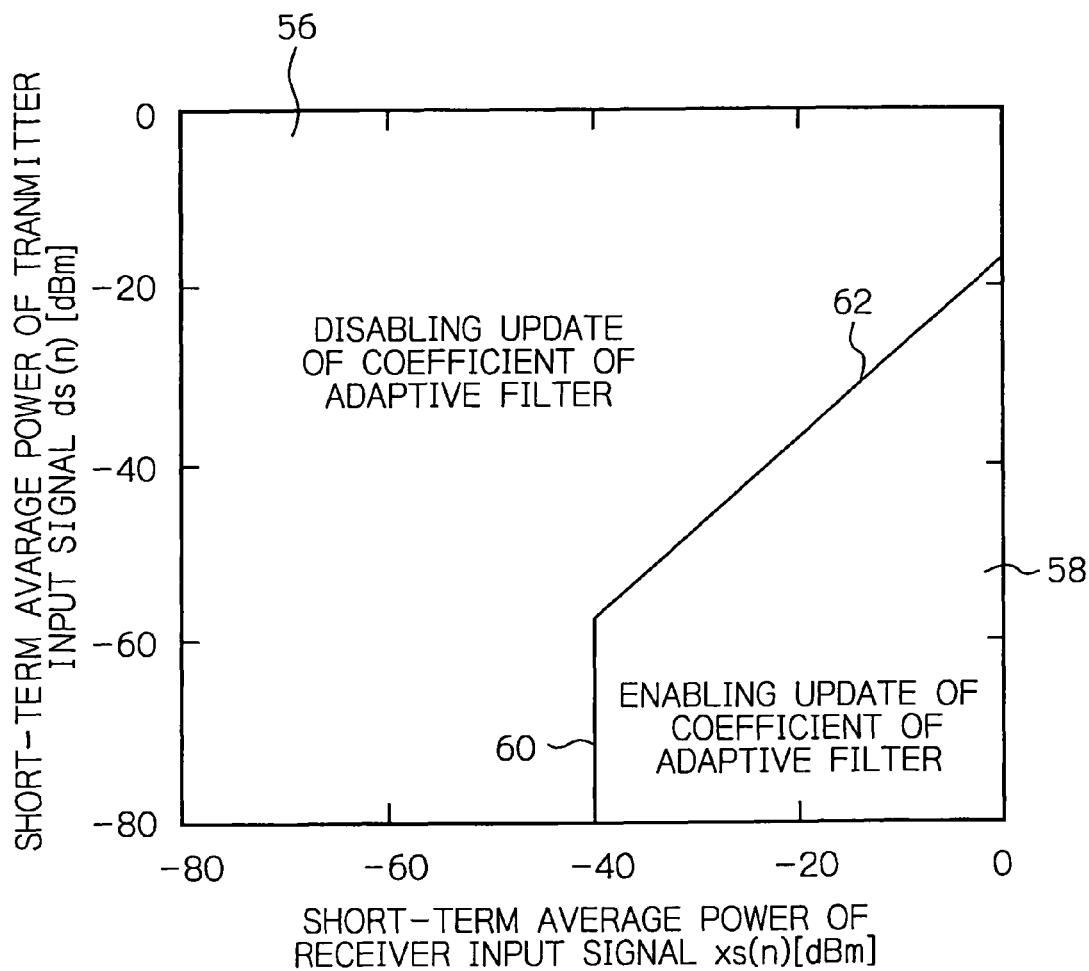
FIG. 5 is a graph showing the characteristic of enabling/disabling the update of coefficient in double-talk detection in the embodiment shown in FIG. 2.

In FIG. 5, parameters for determining the double-talk determination threshold value are set to the threshold value xs_th=−40 dBm, the ERL estimated value=20 dB, and the margin α=3 dB. Thereby, two straight lines shown in FIG. 5 indicate the double-talk determination threshold value.

In a region 56 to the upper left of these two straight lines indicating the double-talk determination threshold value shown in FIG. 5, the update of coefficient of the adaptive filter is disabled. Meanwhile, in a region 58 to the lower right of these two straight lines indicating the double-talk determination threshold value, the update of coefficient of the adaptive filter is enabled.

In FIG. 5, a vertical straight line 60 of the two straight lines indicating the double-talk determination threshold value corresponds to the above-described Step 1. Accordingly, when the short-term average power xs(n) of the receiver input signal is lower than the threshold value xs_th, or −40 dBm, this case corresponds to a region to the left of this vertical straight line 60 to disable the update of coefficient of the adaptive filter.

The other straight line 62, slanting, of the two straight lines indicating the double-talk determination threshold value corresponds to the above-described Step 2. This can be calculated by the expression (21). Accordingly, compared with the value calculated by subtracting the ERL estimated value, specifically 20 dB, from the short-term average power xs(n) of the receiver input signal and adding the margin α=3 dB, when the short-term average power ds(n) of the transmitter input signal is smaller than there, this case corresponds to a region 58 below the slanting straight line 62 to be determined as the single-talk state, enabling the update of coefficient of the adaptive filter.

In the other region, that is a region to the right of the vertical straight line and above the slanting straight line, as described in Step 3, such that either Step 1 or 2 is not applicable, it is determined to be the double-talk state to disable the update of coefficient of the adaptive filter.

In the illustrative embodiment, in order to reduce the calculation amount in this embodiment, the expression (20) for determination of the single-talk shown in Step 2 is converted. Define an expression (22):

$$\beta = 10^{\alpha/20} \quad (22)$$

The expression (22) is converted to obtain an expression (23):

$$\alpha = 20 \times \log_{10}\beta \quad (23)$$

Next, the expressions (19) and (23) are substituted for the expression (20).

$$20 \times \log_{10}(xs(n)) - 20 \times \log_{10}(ds(n)) + 20 \times \log_{10}\beta > 20 \times \log_{10}(xl(n)) - 20 \times \log_{10}(dl(n))$$

This is arranged to obtain an expression (24):

$$\beta \times xs(n) \times dl(n) > xl(n) \times ds(n) \quad (24)$$

The expression (24) is used for this embodiment.

In this embodiment, when the condition of the expression (24) is satisfied in Step 2, this is determined as the single-talk state to control calculation to enable the update of coefficients of the adaptive filter.

Now, the operation of detection process in the double-talk detector 10 will be described below. Initial values xl(0) and dl(0) of the long-term average power of the receiver and transmitter input signals are set to appropriate values such that the estimated ERL is equal to the minimum value ERL_min of the echo path attenuation value.

For example, when the minimum value ERL_min of the echo path attenuation value is equal to 6 dB, the initial value xl(0) of the long-term average power of the receiver input signal is initialized by twice the initial value dl(0) of the long-term average power of the transmitter input signal.

Next, taking an example of a signal input to the echo canceller and the threshold value, the processing operation of the double-talk detector 10 will be described. The parameters used for this example of operation are set to the near end background noise power=−60 dBm, the echo path attenuation value=20 dB, the threshold value xs_th=−40 dBm, the minimum value ERL_min of the echo path attenuation value (initial value of ERL)=6 dB, the threshold value ε=6 dB, and the margin α=3 dB.

It is assumed that an initial state is a silent state such that either near end or far end talker does not speak. In this case, the receiver average power calculator 14 calculates the short-term average power xs(n) of the receiver input signal lower than the threshold value xs_th.

At this time, the near end background noise estimator 12 enables an estimating calculation of the near end background noise, and averages the absolute value |e(n)| of sampled value of the inputted residual signal e(n) to estimate the near end background noise power.

In addition, the attenuation value estimator 18, since Condition 1 is not satisfied, controls to disable the ERL estimating calculation, the ERL estimated value keeping the initial value of 6 dB.

Furthermore, the double-talk determiner 20 determines the result of the determination as "Disable" based on Step 1. Therefore, the coefficients of the adaptive filter are not updated. It is assumed that this silent state continues, the estimated near end background noise power b(n) converging to −60 dBm.

Next, it is assumed that a state occurs such that only the far end talker speaks, namely the single-talk state. Generally, the signal power of an audio signal changes with time. However, in order to describe operations, it is assumed that the signal power of the receiver input signal x(n) continues to keep 0 dBm.

In this case, the short-term average power xs(n) of the receiver input signal is 0 dBm. Then xs(n) is equal to or higher than the threshold value xs_th, which is, for example, −40 dBm.

Now, the near end background noise estimator 12 disables the estimating calculation of the near end background noise to hold the preceding value of −60 dBm as the estimated near end background noise power b(n).

Since the echo path attenuation value is 20 dB and the transmitter input signal d(n) is y(n)+t(n), the transmitter input signal d(n) includes the signal power of the echo signal component y(n) of −20 dBm.

Now, the near end background noise power is −60 dBm, which is much less than the echo signal component y(n). Therefore, the signal power of the transmitter input signal d(n) is −20 dBm, and the short-term average power ds(n) of the transmitter input signal is also −20 dBm.

The attenuation value estimator 18 has the condition for enabling the ERL estimating calculation, that is Conditions 1 to 3 satisfied. The ERL estimating calculation controller 40 controls to enable the ERL estimated value calculator 42 so as to update the long-term average power xl(n) and dl(n) of the receiver and transmitter input signals.

It is assumed that this single-talk state continues, the long-term average power xl(n) and dl(n) of the receiver and transmitter input signals converging to 0 dBm and −20 dBm, respectively. In this case, with the advance of convergence of the IIR-type low-pass filters of the receiver and transmitter average power calculators 44 and 46, the ERL estimated value is closer from the initial value of 6 dB to 20 dB to converge to 20 dB eventually.

In the region of the single-talk state, the ERL estimated value changes from 6 dB to 20 dB. At this time, the double-talk determiner 20 subtracts the ERL estimated value of 6 dB to 20 dB from the short-term average power xs(0 dBm) of the receiver input signal to add the margin α=3 dB. Since the short-term average power ds(−20 dBm) of the transmitter input signal is less than this resulting value of −3 dBm to −17 dBm, the result of the determination is a single-talk to enable the update of coefficients of the adaptive filter.

Now, the ERL estimating calculation is complemented. It is assumed that the signal power of the receiver input signal x(n) is 0 dBm. However, when the signal power of the receiver input signal x(n) is −40 dBm, the transmitter input signal d(n) includes the signal power of −60 dBm of the echo signal component y(n) equivalent to that of −60 dBm of the near end transmitter output signal t(n) since the echo path attenuation value is 20 dB.

Since the near end transmitter output signal t(n) is not correlated with the echo signal component y(n), at this time, the signal level of the transmitter input signal d(n) is less than the value of −54 dBm calculated by adding the threshold value ε of 6 dB to the estimated near end background noise power b(n) of −60 dB. Therefore, since the condition for enabling the ERL estimating calculation is not satisfied, the ERL estimated value is kept holding the preceding value.

Accordingly, only when the signal power of the echo signal component y(n) is equal to a certain level or higher than that of the near end transmitter output signal t(n), the ERL estimation is calculated to improve the accuracy of the ERL estimated value. Once the ERL estimated value converges to 20 dB, the double-talk is determined by the threshold value of −17 dB calculated by subtracting the ERL estimated value of 20 dB from the short-term average power xs(n) of the receiver input signal and by adding the margin a of 3 dB.

Next, the operations after the ERL estimated value converging to 20 dB will be described. When the receiver input signal x(n) does not include an audio signal and the short-term average power xs(n) of the receiver input signal is lower than the threshold value xs_th of −40 dBm, the estimated near end background noise power b(n) is updated. In this case, when the near end transmitter output signal t(n) includes only the background noise of −60 dBm, the estimated near end background noise power b(n) is kept holding −60 dBm.

When the near end transmitter output signal t(n) includes an audio signal, the estimated near end background noise power b(n) increases. However, when the near end transmitter output signal t(n) includes only the background noise of −60 dBm again, the estimated near end background noise power b(n) returns to −60 dBm.

Next, it is assumed that the receiver input signal x(n) includes an audio signal. Generally, the signal power of an audio signal changes with time. However, in order to describe operations, it is assumed that the signal power of the receiver input signal x(n) continues to keep 0 dBm. In this case, since the echo path attenuation value is 20 dBm, the transmitter input signal d(n) includes the signal power of −20 dBm of the echo signal component y(n).

The double-talk determiner 20 subtracts the ERL estimated value of 20 dB from the short-term average power xs(0 dBm) of the receiver input signal and adds the margin a of 3 dB to result in −17 dBm. When the short-term average power ds(n) of the transmitter input signal is less than this resulting value of −17 dBm, the single-talk is determined. When it is larger than the value, the double-talk is determined.

First, when the near end transmitter output signal t(n) includes only the background noise of −60 dBm, the signal power of the near end transmitter output signal t(n) is much less than that of −20 dBm of the echo signal component y(n). Therefore, the signal power of the transmitter input signal d(n)(=y(n)+t(n)) as well as the short-term average power ds(n) of the transmitter input signal is −20 dBm.

The attenuation value estimator 18 has the condition for enabling the ERL estimating calculation satisfied. However, since the long-term average power xl(n) and dl(n) of the receiver and transmitter input signals has already converged to 0 dBm and −20 dBm, respectively, the ERL estimated value is kept holding 20 dB.

The double-talk determiner 20 subtracts the ERL estimated value of 20 dB from the short-term average power xs(0 dBm) of the receiver input signal and adds the margin a of 3 dB to result in −17 dBm. Since the short-term average power ds(−20 dBm) of the transmitter input signal is less than this resulting value of −17 dBm, the result of the determination is a single-talk to enable the update of coefficients of the adaptive filter.

On the other hand, when the near end transmitter output signal t(n) includes the background noise of −60 dBm and an audio signal, the operations are different independent upon the signal power of the short-term average power ds(n) of the transmitter input signal.

(1) Where −20 dBm<the Short-Term Average Power ds(n) of the Transmitter Input Signal<−17 dBm Since the transmitter input signal d(n)(=y(n)+t(n)) includes the signal power of −20 dBm of the echo signal component y(n), the signal power of the echo signal component y(n) can be generally considered to be equal to or higher than that of the near end transmitter output signal t(n), that is y(n)≧t(n) when this condition is satisfied.

The near end background noise estimator 12 does not update the estimated near end background noise power b(n), which therefore keeps the preceding value of −60 dBm.

The attenuation value estimator 18 enables the ERL estimating calculation. However, the short-term average power xs(n) of the receiver input signal is 0 dBm, and the short-term average power ds(n) of the transmitter input signal is in the range of −20 dBm to −17 dBm. Therefore, the ERL estimated value does not significantly change from −20 dB.

The double-talk determiner 20 determines that the result of the double-talk determination is a single-talk, enabling the update of coefficient of the adaptive filter. Since this state is such that the signal power of the echo signal component y(n) can be considered to be equal to or higher than that of the near end transmitter output signal t(n), the single-talk determination results as expected.

(2) Where −17 dBm≦the Short-Term Average Power ds(n) of the Transmitter Input Signal<−6 dBm Since the transmitter input signal d(n)(=y(n)+t(n)) includes the signal power of −20 dBm of the echo signal component y(n), the signal power of the echo signal component y(n) can be generally considered to be less than that of the near end transmitter output signal t(n), that is y(n)<t(n) when this condition is satisfied.

The double-talk determiner 20 determines that the result of the double-talk determination is a double-talk, disabling the update of coefficient of the adaptive filter. Since this state is such that the signal power of the echo signal component y(n) can be considered to be less than that of the near end transmitter output signal t(n), the double-talk determination results as expected.

The attenuation value estimator 18 enables the ERL estimating calculation. However, when the double-talk determination results, the long-term average power is calculated by the IIR-type low-pass filter having an increasing time constant. During an ordinary conversation, since a double-talk state continues for a short period of time, the ERL estimated value hardly changes from −20 dBm.

(3) Where −6 dBm≦the Short-Term Average Power ds(n) of the Transmitter Input Signal Since the transmitter input signal d(n)(=y(n)+t(n)) includes the signal power of −20 dBm of the echo signal component y(n), the signal power of the echo signal component y(n) is much less than that of the near end transmitter output signal t(n) when this condition is satisfied.

The double-talk determiner 20 determines that the result of the double-talk determination is a double-talk, disabling the update of coefficient of the adaptive filter. Since the signal power of the echo signal component y(n) is much less than that of the near end transmitter output signal t(n), this is a determination result as expected.

The attenuation value estimator 18 subtracts a decibel value corresponding to the short-term average power ds(n) of the transmitter input signal from a decibel value corresponding to the short-term average power xs(n) of the receiver input signal. Since this resulting value is less than ERL_min, the ERL estimating calculation is disabled. Thereby, during an obvious double-talk state, the ERL estimated value is prevented from decreasing.

As described above, the double-talk detector 10 in accordance with this embodiment, only when the short-term average power ds(n) of the transmitter input signal is equal to a certain level or higher than the estimated near end background noise power b(n) and a value obtained by subtracting a decibel value corresponding to the short-term average power ds(n) of the transmitter input signal from that to the short-term average power xs(n) of the receiver input signal is equal to or higher than the minimum value ERL_min of the echo path attenuation value, the ERL estimating calculation is enabled. Therefore, when the state is obviously not a single-talk, the ERL estimated value can keep the preceding value.

In addition, the double-talk detector 10 of this embodiment, in the case of double-talk determination other than this, switches the time constants of averaging filters of the receiver and transmitter average power calculators 44 and 46 to large values, preventing the ERL estimated value from decreasing extremely in the double-talk state. Therefore, since the double-talk detector 10 can estimate the echo path attenuation value accurately, the accuracy of detection of the double-talk can be improved.

Figure 6:
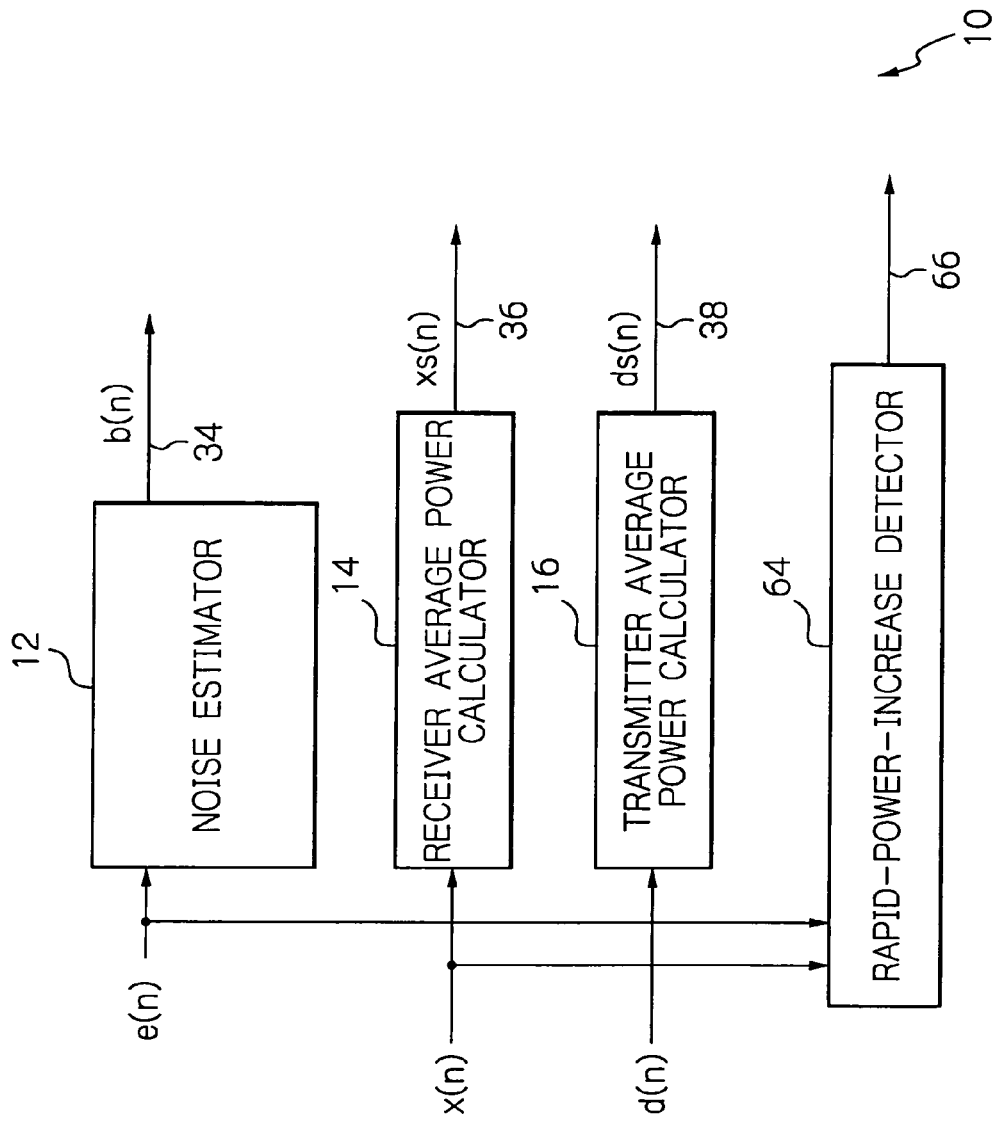
FIG. 6 is a schematic block diagram showing the main part of the configuration of an alternative embodiment of a double-talk detector to which the present invention is applied.

Well, an alternative embodiment of the double-talk detector 10 in accordance with the present invention will be described. The main configuration of the double-talk detector 10 in accordance with this alternative embodiment is shown in FIG. 6. The double-talk detector 10 has a rapid-power-increase detector 64 in addition to the components shown in FIG. 2. The double-talk detector 10 may be the same as the preceding embodiment except for a function of the double-talk determiner 20 associated with the addition of the rapid-power-increase detector 64.

The rapid-power-increase detector 64 has a function to monitor the receiver input signal x(n) and the residual signal e(n) to immediately detect the rapid increase in the signal power of the near end transmitter output signal t(n). The rapid-power-increase detector 64 outputs a detection signal 66 to the double-talk determiner 20.

The double-talk determiner 20 detects a double-talk through the detection way like the preceding embodiment. In addition, the double-talk determiner 20 has a function to receive the result of the detection from the rapid-power-increase detector 64 to determine the double-talk in response to the rapid increase in the signal power of the near end transmitter output signal t(n), in priority to the result of the determination described in the preceding embodiment. Thus, the double-talk detector 10 can disable the update of coefficient of the adaptive filter, preventing the divergence of coefficient of the adaptive filter by the rapid increase in the signal power of the near end transmitter output signal t(n).

Figure 7:
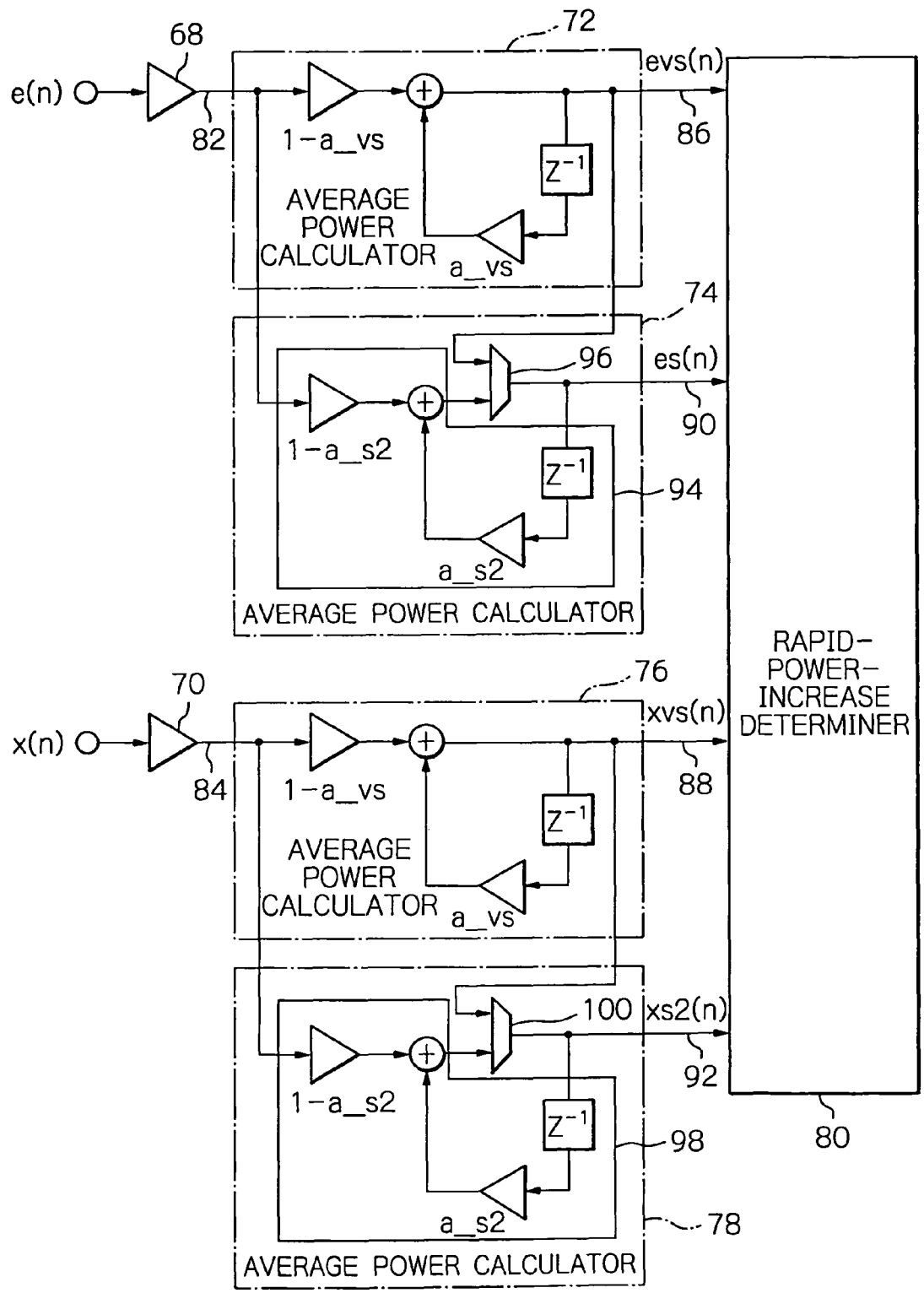
FIG. 7 is a schematic block diagram showing a configuration of a rapid-power-increase detector shown in FIG. 6.

An exemplified configuration of the rapid-power-increase detector 64 is shown in FIG. 7. The rapid-power-increase detector 64 includes absolute value calculators 68 and 70, average power calculators 72, 74, 76, and 78, and a rapid-power-increase determiner 80, which are interconnected as illustrated.

The absolute value calculator 68 has a function to receive the residual signal e(n) to obtain the absolute value of signal power of the residual signal e(n). The absolute value calculator 68 supplies the calculated absolute value 82 to the average power calculators 72 and 74.

The absolute value calculator 70 has a function to receive the receiver input signal x(n) to obtain the absolute value of signal power of the receiver input signal x(n). The absolute value calculator 70 supplies the calculated absolute value 84 to the average power calculators 76 and 78.

The average power calculator 72 has a function to receive the supplied absolute value 82 to calculate the average signal power evs(n) of the residual signal for a predetermined very-short period of time. The average power calculator 72 supplies the calculated average signal power evs(n) to the rapid-power-increase determiner 80 and the average power calculator 74.

The average power calculator 76 has a function to receive the supplied absolute value 84 to calculate the average signal power xvs(n) of the receiver input signal for a predetermined very-short period of time. The average power calculator 76 supplies the calculated average signal power xvs(n) to the rapid-power-increase determiner 80 and the average power calculator 78.

Each of the average power calculators 72 and 76 has an IIR-type low-pass filter and is adapted to always perform calculation. The average power calculators 72 and 76 input the inputted absolute values |e(n)| 82 and |x(n)| 84 of sampled values of the signals e(n) and x(n) to the IIR-type low-pass filters having a proper time constant, thereby averaging these absolute values to calculate very-short-term average power evs(n) 86 and xvs(n) 88, respectively.

Now, coefficients of the IIR-type low-pass filters are represented as "a_vs" and "1–a_vs", and the coefficient "a_vs" is defined by a_vs=exp(–T/CR_vs). The variable T indicates a sampling interval of the IIR filter and the variable CR_vs indicates the time constant of the average power calculators 72 and 76. The time constant CR_vs is set to a value less than a below-described time constant CR_s2 of the average power calculators 74 and 78.

The average power calculator 72 calculates the very-short-term average power evs(n) through an expression (25):

$$evs(n)=|e(n)|\times(1\times a\_vs)+evs(n-1)\times a\_vs \qquad (25)$$

The average power calculator 76 calculates the very-short-term average power xvs(n) through an expression (26):

$$xvs(n)=|x(n)|\times(1-a\_vs)+xvs(n-1)\times a\_vs \qquad (26)$$

The average power calculator 74 has a function to receive the supplied absolute value 82 and an output 86 from the average power calculator 72 to calculate the average signal power es(n) 90 of the residual signal for a predetermined short period of time. The average power calculator 74 supplies the calculated average signal power es(n) 90 to the rapid-power-increase determiner 80.

The average power calculator 78 has a function to receive the supplied absolute value 84 and an output 88 from the average power calculator 76 to calculate the average signal power xs2(n) 92 of the receiver input signal for a predetermined short period of time. The average power calculator 78 supplies the calculated average signal power xs2(n) 92 to the rapid-power-increase determiner 80.

Each of the average power calculators 74 and 78 has an IIR-type low-pass filter and is adapted to always perform calculation. The average power calculators 74 and 78 include IIR-type low-pass filters 94 and 98 and selectors 96 and 100, respectively.

The average power calculators 74 and 78 input the inputted absolute values |e(n)| 82 and |x(n)| 84 of sampled values of the signals e(n) and x(n) to IIR-type low-pass filters 94 and 98 having a proper time constant, thereby averaging these absolute values to calculate short-term average power es(n) 90 and xs2(n) 92, respectively.

Coefficients of these IIR-type low-pass filters 94 and 98 are represented as "a_s2" and "1–a_s2", and the coefficient "a_s2" is defined by a_s2=exp(–T/CR_s2). The variable T indicates a sampling interval of the IIR-type filter and the variable CR_s2 indicates the time constant of the average power calculators 74 and 78. This CR_s2 may be the same value as the time constant CR_s of the preceding embodiment, or may be different therefrom.

The selector 96 has a function of receiving the short-term average power es(n) outputted from the IIR-type low-pass filter 94 and the very-short-term average power evs(n) to output the smaller value min(es(n), evs(n)) of these inputs. The selector 96 outputs the calculated short-term average power es(n) 90 to the rapid-power-increase determiner 80 and a delay element $Z^{-1}$ of the IIR-type low-pass filter 94.

The average power calculator 74 calculates the short-term average power es(n) of the residual signal outputted by the IIR-type low-pass filter 94 through an expression (27):

$$es(n)=|e(n)|\times(1-a\_s2)+es(n-1)\times a\_s2 \qquad (27)$$

In addition, the selector 96 of the average power calculator 74 calculates the short-term average power es(n) of the residual signal outputted by the average power calculator 74 through an expression (28):

$$es(n)=\min(es(n),evs(n)) \qquad (28)$$

The selector 100 has a function to receive the short-term average power xs2(n) and the very-short-term average power xvs(n) to output the smaller value min (xs2(n), xvs(n)) of these inputs. The selector 100 outputs the calculated short-term average power xs2(n) 92 to the rapid-power-increase determiner 80 and a delay element $Z^{-1}$ of the IIR-type low-pass filter 98.

The average power calculator 78 calculates the short-term average power xs2(n) of the residual signal outputted by the IIR-type low-pass filter 98 through an expression (29):

$$xs2(n)=|x(n)|\times(1-a\_s2)+xs2(n-1)\times a\_s2 \qquad (29)$$

In addition, the selector 100 of the average power calculator 78 calculates the short-term average power xs2(n) of the residual signal outputted by the average power calculator 78 through an expression (30):

$$xs2(n)=\min(xs2(n),xvs(n)) \qquad (30)$$

The rapid-power-increase determiner 80 has a function to receive the very-short-term average power evs(n) 86 and xvs (n) 88, and the short-term average power es(n) 90 and xs2(n) 92 to determine whether or not the following expression (31) is satisfied, determining the rapid increase in the near end transmitter output signal t(n) when the expression (31) is true.

$$evs(n)/es(n)-xvs(n)/xs2(n)>\zeta \qquad (31)$$

The rapid-power-increase determiner 80 supplies the obtained determination result 66 to the double-talk determiner 20. Thereby, the double-talk determiner 20 controls to disable the update of coefficient of the adaptive filter in priority to the result of the double-talk determination described in the preceding embodiment.

Now, the threshold value $\zeta$ is a positive constant, to which, for example, a value of "1" may be applied. The term evs(n)/es(n) takes a value obtained by dividing the very-short-term average power evs(n) of the residual signal by the short-term average power es(n). In addition, since the output es(n) takes a value after the update through a function min(es(n), evs(n)) described by the expression (28), the quotient evs(n)/es(n) is equal to or higher than unity.

When the signal power of the residual signal e(n) increases, both the very-short-term average power evs(n) and the short-term average power es(n) increase. However, because of a difference between their time constants, the very-short-term average power evs(n) has a higher response sensitivity than that of the short-term average power es(n). Therefore, in an early stage that the signal power of the residual signal e(n) turns to increase, the quotient evs(n)/es(n) is more than unity. The more rapidly the signal power increase, the larger the value gets. Accordingly, the quotient evs(n)/es(n) indicates the degree of increase in the signal power of the residual signal e(n).

Similarly, the quotient xvs(n)/xs2(n) takes a value obtained by dividing the very-short-term average power xvs(n) of the receiver input signal by the short-term average power xs2(n). Since the output xs2(n) takes a value after the update through a function min(xs2(n), xvs(n)) described by the expression (30), the quotient xvs(n)/xs2(n) is equal to or higher than unity.

When the signal power of the receiver input signal x(n) increases, both the very-short-term average power xvs(n) and the short-term average power xs2(n) increase. However, because of a difference between their time constants, the very-short-term average power xvs(n) has a higher response sensitivity than that of the short-term average power xs2(n). Therefore, in an early stage that the signal power of the receiver input signal x(n) turns to increase, the quotient xvs (n)/xs2(n) is more than unity. The more rapidly the signal power increase, the larger the value gets. Accordingly, the quotient xvs(n)/xs2(n) indicates the degree of increase in the signal power of the receiver input signal x(n).

The left-hand side of the expression (31) is calculated by subtracting the degree (xvs(n)/xs2(n)) of increase in the signal power of the receiver input signal from the degree (evs (n)/es(n)) of increase in the signal power of the residual signal. When the value of the left-hand side is larger than the threshold value $\zeta$, it is determined that the near end transmitter output signal t(n) increase rapidly to disable the update of coefficient of the adaptive filter, preventing the divergence of the coefficients.

In addition, multiplying the both-hands side of the expression (31) by xs2(n)×es(n) gives an expression (32):

$$evs(n) \times xs2(n) - xvs(n) \times es(n) > \zeta \times xs2(n) \times es(n) \quad (32)$$

The expression (32) may be used as a determination formula, thereby vanishing the divisions to reduce the amount of calculation.

Next, operations of detecting a double-talk will be described in the double-talk detector 10 in accordance with the alternative embodiment. The degree (evs(n)/es(n)) of increase in the residual signal is simulated to obtain signal waveforms shown in FIG. 8.

In this simulation, used parameters are set as the time constant CR_vs of 4 ms in the average power calculator 72, the time constant CR_s2 of 16 ms in the average power calculator 74, and the threshold value $\zeta$ of 1.

When the signal power of the near end transmitter output signal t(n) increases rapidly and the signal power of the receiver input signal x(n) hardly changes, both the signal power of the transmitter input signal d(n)(=t(n)+y(n)) and the residual signal e(n)(=t(n)+$\Delta$y(n)) increase rapidly.

Figure 8A:
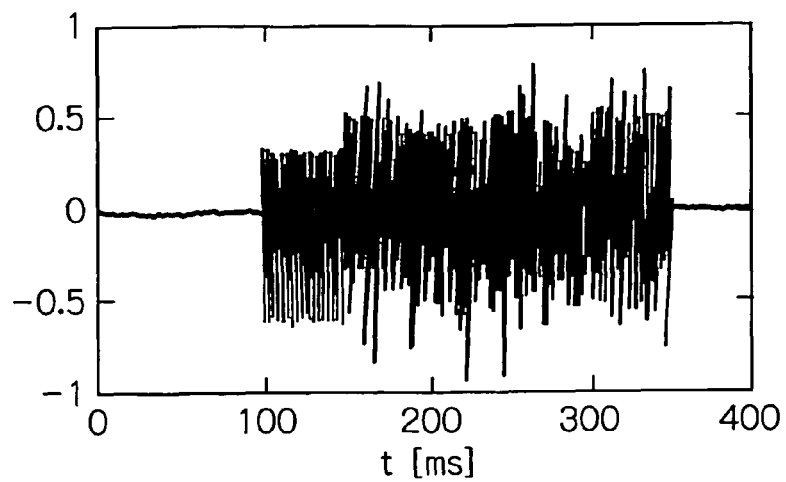
FIG. 8A shows the waveform of a residual signal e(n) simulated and inputted in the rapid-power-increase detector shown in FIG. 6.
Figure 8B:
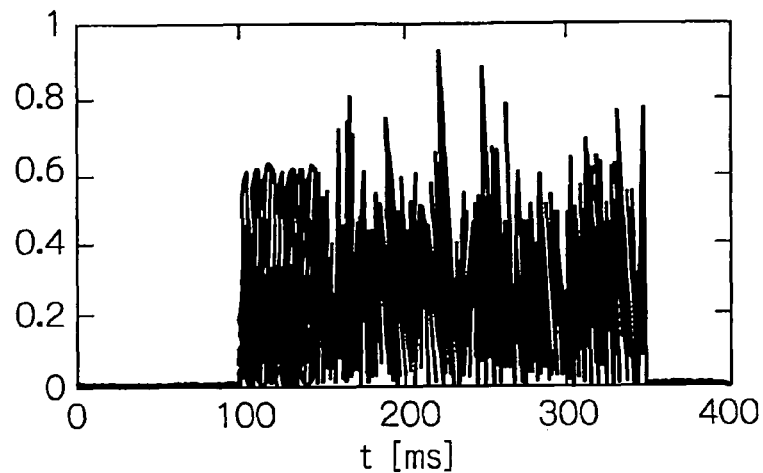
FIG. 8B shows the waveform of an absolute value |e(n)| of the inputted residual signal in the rapid-power-increase detector shown in FIG. 6.

As the signal power of this near end transmitter output signal t(n) increases rapidly, it is assumed that, as shown in FIG. 8A, the signal power of the residual signal e(n) also increases rapidly at the time of 100 ms in the signal waveform. At this time, the absolute value calculator 68 outputs the absolute value |e(n)| 82 of the residual signal as the signal waveform shown in FIG. 8B, and the very-short-term and short-term average power evs(n) 86 and es(n) 90 are shown as signal waveforms in FIGS. 8C and 8D, respectively.

Figure 8C:
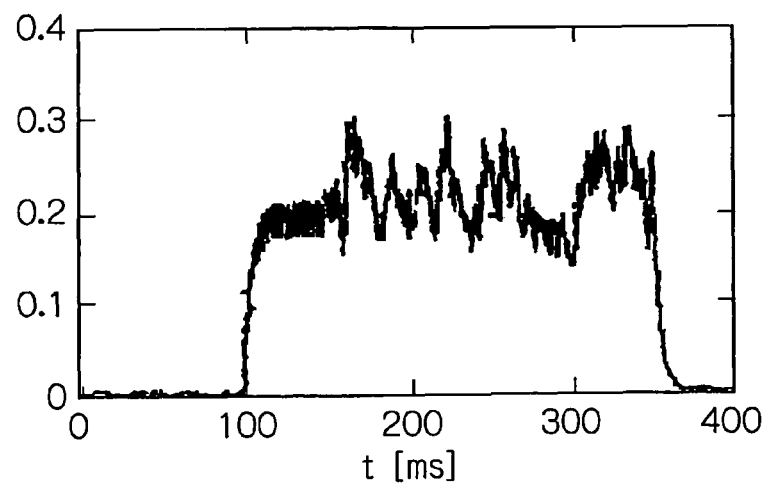
FIG. 8C shows the waveform of an very-short-term average power evs(n) of the inputted residual signal in the rapid-power-increase detector shown in FIG. 6.
Figure 8D:
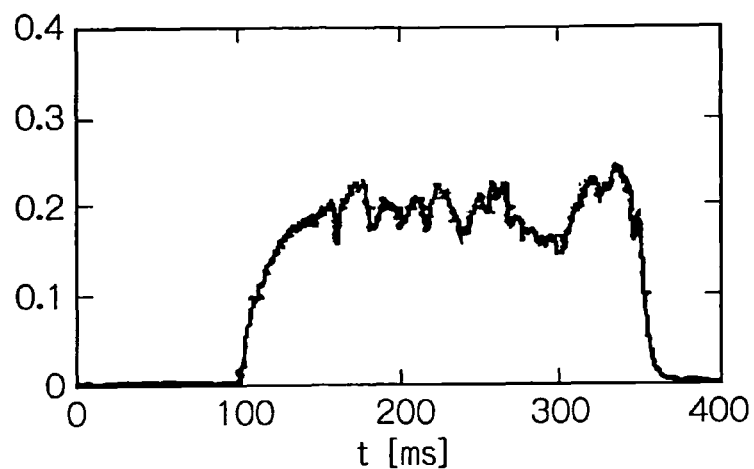
FIG. 8D shows the waveform of a short-term average power es(n) of the inputted residual signal in the rapid-power-increase detector shown in FIG. 6.

Both the very-short-term and short-term average power evs(n) 86 and es(n) 90, as shown in FIGS. 8C and 8D, respectively, increase at the time of 100 ms. However, the average power calculators 72 and 74 have IIR-type low-pass filters having their different time constants from each other. Therefore, because of this difference between their time constants, the very-short-term average power evs(n) increases more rapidly than the short-term average power es(n).

Figure 8E:
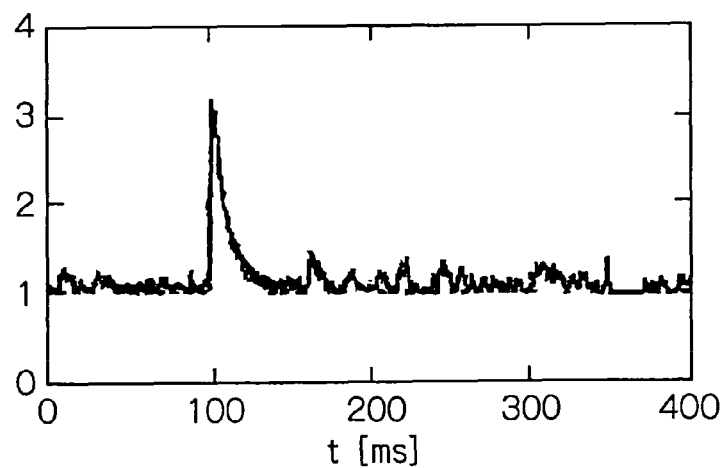
FIG. 8E shows the waveform of the degree (evs(n)/es(n)) of increase in the signal power of the inputted residual signal in the rapid-power-increase detector shown in FIG. 6.

Thereby, as shown in FIG. 8E, the degree (evs(n)/es(n)) of increase in the signal power of the residual signal slightly exceeds unity before the time of 100 ms, but rapidly increases to about three at the time of 100 ms. Then, the short-term average power es(n) also increases. Thereby, the degree (evs (n)/es(n)) of increase in the signal power of the residual signal returns to a value slightly exceeding unity.

During this time, since the signal power of the receiver input signal x(n) hardly changes, it is assumed that the degree (xvs(n)/xs2(n)) of increase in the signal power of the receiver input signal is equal to unity.

At this time, the quotient xvs(n)/xs2(n) equal to unity and the threshold value $\zeta$ equal to unity are substituted for the expression (31) to obtain the following relation about the degree (evs(n)/es(n)) of increase in the signal power of the residual signal.

$$(evs(n)/es(n)) - 1 > 1$$

From this relation, an expression (33) will be derived.

$$(evs(n)/es(n)) > 2 \quad (33)$$

Figure 8F:
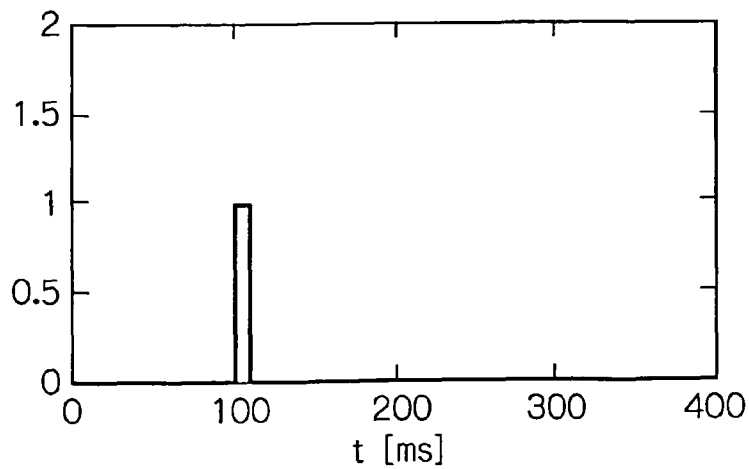
FIG. 8F shows how immediately the rapid increase in a near end transmitter output signal t(n) detected in the rapid-power-increase detector shown in FIG. 6.

Therefore, the rapid-power-increase determiner 80 detects a timing that the degree (evs(n)/es(n)) of increase in the signal power of the residual signal satisfies the condition of the expression (33), or the condition based on the expression (31). This detection, as shown in FIG. 8F, is to detect a "1" level. Based on detecting this determination, the double-talk determiner 20 controls to disable the update of coefficient of the adaptive filter.

The rapid-power-increase determiner 80, as shown in FIG. 8F, immediately accomplishes the detection of rapid increase in the near end transmitter output signal t(n) at the time of 100 ms. Then, once the change in the signal power of the residual signal vanishes, the result of the detection returns to "0" or an undetected state. After the result of the detection returns to "0" (undetected), the double-talk determination way described in the preceding embodiment is applied to the double-talk detection.

Then, at the time of 350 ms, when the signal power of the near end transmitter output signal t(n) decreases rapidly, the signal power of the residual signal e(n) also decreases rapidly as shown in FIG. 8A. In addition, the very-short-term and short-term average power evs(n) 86 and es(n) 90, as shown in FIGS. 8C and 8D decrease, respectively.

At this time, the selector 96 selects a smaller value min(evs (n), es(n)) of the very-short-term and short-term average power evs(n) and es(n). Thereby, since transient responses of both the filters depend on the time constant CR_vs of the average power calculators 72, es(n) immediately decreases to be nearly evs(n). Thereby, the degree (evs(n)/es(n)) of increase in the signal power of the residual signal is also nearly equal to unity.

In addition, the rapid-power-increase determiner 80, as shown in FIGS. 8E and 8F, does not detect the change in the signal power of the near end transmitter output signal t(n), for example, its rapid decrease.

Therefore, right after decreasing rapidly, even if the signal power of the residual signal e(n) rapidly increases again, this rapid increase can be detected since the short-term average power es(n) has been nearly the very-short-term average power evs(n) right before this rapid increase.

If the signal power of the residual signal e(n) decreases rapidly without the selector 96, the very-short-term average power evs(n) decreases more rapidly than the short-term average power es(n) because of a difference between their time constants.

At this time, right after decreasing rapidly, if the signal power of the residual signal e(n) rapidly increases again, the short-term average power es(n) may be much larger than the very-short-term average power evs(n) right before this rapid increase. Therefore, since the degree (evs(n)/es(n)) of increase in the signal power of the residual signal becomes a small value, the rapid increase in the signal power of the residual signal e(n) may not be detected. Thus, the degree (evs(n)/es(n)) of increase in the residual signal, only when the signal power of the residual signal e(n) increases rapidly. Otherwise, the value of this degree slightly exceeds the unity.

Therefore, the timing of only the rapid change in the signal power of the near end transmitter output signal t(n) can be extracted. In addition, right after decreasing rapidly, even if the signal power of the residual signal e(n) rapidly increases again, this rapid increase can be detected.

In addition to these cases, the rapid increase in the signal power of the residual signal e(n)(=t(n)+Δy(n)) is exemplified by a rapid increase in the signal power of the receiver input signal x(n), particularly when the signal power of the residual echo signal component Δy(n) increases without converging the adaptive filter.

However, in the latter case, when the near end transmitter output signal t(n) is nearly null, the degree (evs(n)/es(n)) of increase in the residual signal increases up to the value close to the degree (xvs(n)/xs2(n)) of increase in the signal power of the receiver input signal.

When the near end transmitter output signal t(n) is null, the rapid increase in the signal power of the receiver input signal x(n) causes the degree (evs(n)/es(n)) of increase in the signal power of the residual signal to rapidly increase up to, for example, about three as shown in FIG. 8E.

In addition, the degree (xvs(n)/xs2(n)) of increase in the signal power of the receiver input signal also rapidly increases up to, for example, about three as shown in FIG. 8E with the rapid increase in the receiver input signal x(n).

At this time, in the expression (31), the quotient evs(n)/es(n) of three and the quotient xvs(n)/xs2(n) of three cause the value of the left-hand side to be zero.

Therefore, since the value of left-hand side of the expression (31) is zero, even the threshold value ζ equal to unity does not satisfy the condition of the expression (31). Thereby, the rapid-power-increase determiner 80 does not detect the rapid increase in the near end transmitter output signal power, and does not affect control of the update of coefficient of the adaptive filter.

Accordingly, even the rapid increase in the signal power of the receiver input signal x(n), because of the rapid increase in the degree (xvs(n)/xs2(n)) of increase in the signal power of the receiver input signal simultaneous with the rapid increase in the degree (evs(n)/es(n)) of increase in the signal power of the residual signal, does not satisfy the condition of the expression (31), and does not interrupt the operation of convergence of the adaptive filter.

In this way, according to this alternative embodiment, in addition to the advantageous effect described in the preceding embodiment, the rapid-power-increase detector 64 can compare a value obtained by subtracting the degree (xvs(n)/xs2(n)) of increase in the signal power of the receiver input signal from the degree (evs(n)/es(n)) of increase in the signal power of the residual signal with the threshold value ζ, thereby immediately detecting the rapid increase in the signal power of the near end transmitter output signal t(n). Therefore, in the case of rapid increase in the signal power of the near end transmitter output signal t(n), the update of coefficient of the adaptive filter can be controlled to be disabled.

Thereby, when the single-talk state is shifted to the double-talk state, the signal component of the near end transmitter output signal t(n) included in the residual signal e(n)(=t(n)+Δy(n)) increases rapidly and delays the double-talk detection to be used to update the coefficient of the adaptive filter, causing the significant divergence of the coefficient, which can be prevented.

As described above, this alternative embodiment can immediately detect the double-talk state, thereby preventing the divergence of the coefficient to significantly improve the stability of the echo canceller.

The double-talk detector of the present invention can be applied to not only an echo canceller eliminating a line echo caused in a hybrid circuit having a two-to-four-wire conversion function in telephone communications but also an echo canceller eliminating an echo leaking from a loudspeaker to a microphone, namely an acoustic echo. In addition, it can be applied to control of a nonlinear processor and an echo suppressor further reducing a residual signal e(n) outputted from an echo canceller.

The double-talk detector of the present invention is applied to the double-talk detector 10 in the above-described two embodiments, which are implemented implicitly in the form of hardware. However, functions of the double-talk detector 10 may be also implemented as software. In addition, the embodiments of the present invention may be modified to read below.

The ERL estimation in the above-described embodiments is controlled to be enabled only when all the three conditions are satisfied. However, the ERL estimbaiont may be controlled to be enabled when any one or two of these conditions are satisfied. The three conditions may also be combined with any other conditions to be applied.

The average power of each signal can be calculated through other broad ways than those described in the above-described two embodiments, to which it is not restricted. For example, in the illustrative embodiments, the IIR-type low-pass filter of the average power calculator has the absolute value of the sampled value inputted. However, a value obtained by squaring the sampled value may be inputted. In addition, the average power calculator may have not only IIR-type low-pass filters but also FIR-type low-pass filters or other ways applied.

In order to reduce the amount of calculation, the above-described embodiments perform as few divisions and logarithm calculations as possible. However, the system may be designed to perform divisions and logarithmic calculations. When logarithmic calculations are performed, a decibel value corresponding to the short-term average power ds(n) of the transmitter input signal is subtracted from a decibel value corresponding to the short-term average power xs(n) of the receiver input signal to calculate a short-term average echo path attenuation value, which may be inputted to the ERL estimated value calculator. In this case, the ERL estimated value calculator can include only a single filter for a process of long-term averaging, which outputs the ERL estimated value.

In addition, the conditions for enabling the ERL estimating calculation and for determining double-talk sate include the same threshold value xs_th to be compared with the short-term average power xs(n). However, their threshold values may be different from each other. Other parameters described with identical symbols in the above may be separated as different parameters if necessary.

In other possibilities of a double-talk detector in accordance with the present invention, when rapid increase in the near end transmitter output signal is detected, the result of this detection may be used to control to disable the update of coefficient of the adaptive filter. However, the ERL estimating calculation may also be controlled to be disabled, thereby reducing change in the ERL estimated value associated with the rapid increase in the near end transmitter output signal.

The entire disclosure of Japanese patent application No. 2007-193625 filed on Jul. 25, 2007, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A double-talk detector for detecting a double-talk state based on a receiver input signal, a transmitter input signal and a residual signal resultant from eliminating an echo in an echo canceller including an adaptive filter having a filter coefficient to control update of the coefficient, comprising:
a noise estimator for finding an estimated power value of near end background noise based on the residual signal;
a first transmitter average power calculator for finding an average power value of the transmitter input signal;
a first receiver average power calculator for finding an average power value of the receiver input signal;
an attenuation value estimator for finding an estimated echo path attenuation value through a predetermined echo path attenuation value estimating process based on the estimated power value of the near end background noise, the average power value of the transmitter input signal and the average power value of the receiver input signal; and
a double-talk determiner for detecting a double-talk state based on the estimated echo path attenuation value, the average power value of the transmitter input signal and the average power value of the receiver input signal to control the update of the coefficient.

2. The detector in accordance with claim 1, wherein said noise estimator comprises a filter for finding an average signal power based on the residual signal to output the resulting average signal power as the estimated power value of the near end background noise where the average power of the receiver input signal is lower than a predetermined threshold value.

3. The detector in accordance with claim 1, wherein said attenuation value estimator comprises:
an attenuation value calculation controller for controlling a calculation of the estimated echo path attenuation value where a predetermined condition for controlling the calculation of the echo path attenuation value is satisfied; and
an attenuation value estimation calculator for receiving a calculational instruction from said attenuation value calculation controller to find the estimated echo path attenuation value based on the average power value of the transmitter input signal and the average power value of the receiver input signal.

4. The detector in accordance with claim 3, wherein said attenuation value estimation calculator has a short-term average echo path attenuation value calculated by subtracting a decibel value corresponding to the average power value of the transmitter input signal from a decibel value corresponding to the average power value of the receiver input signal inputted to average the inputted short-term average echo path attenuation value for a further period of time, thereby calculating the estimated echo path attenuation value.

5. The detector in accordance with claim 3, wherein said attenuation value estimation calculator comprises:
a second transmitter average power calculator for calculating an average power value of the transmitter input signal for a longer averaging calculation period of time than that of said first transmitter average power calculator; and
a second receiver average power calculator for calculating an average power value of the receiver input signal for a longer averaging calculation period of time than that of said first receiver average power calculator.

6. The detector in accordance with claim 5, wherein
each of said second transmitter average power calculator and said second receiver average power calculator comprises a filter,
said filter having a characteristic of response in a case of double-talk determination set to be blunter than that in a case of single-talk determination based on a result of a determination from said double-talk determiner.

7. The detector in accordance with claim 3, wherein said attenuation value calculation controller gives a calculational instruction of an echo path attenuation value where a first condition is satisfied such that the average power value of the receiver input signal obtained through said first receiver average power calculator is equal to or more than a predetermined threshold value.

8. The detector in accordance with claim 3, wherein said attenuation value calculation controller gives a calculational instruction of the echo path attenuation value where a second condition is satisfied such that a value calculated by subtracting a decibel value corresponding to the average power value of the transmitter input signal obtained through said first transmitter average power calculator from a decibel value corresponding to the average power value of the receiver input signal obtained through said first receiver average power calculator is equal to or more than a predetermined minimum value of the echo path attenuation value.

9. The detector in accordance with claim 3, wherein said attenuation value calculation controller gives a calculational instruction of the echo path attenuation value where a third condition is satisfied such that a value calculated by subtracting a decibel value corresponding to the estimated power value of the near end background noise from a decibel value corresponding to the average power value of the transmitter input signal obtained through said first transmitter average power calculator is equal to or more than a predetermined threshold value.

10. The detector in accordance with claim 3, wherein said attenuation value calculation controller gives a calculational instruction of the echo path attenuation value where all of first, second and third conditions, or any combinations of the first, second and third conditions are satisfied,
the first condition being such that the average power value of the receiver input signal obtained through said first receiver average power calculator is equal to or more than a predetermined threshold value,
the second condition being such that a value calculated by subtracting a decibel value corresponding to the average power value of the transmitter input signal obtained through said first transmitter average power calculator from a decibel value corresponding to the average power value of the receiver input signal obtained through said first receiver average power calculator is equal to or more than a predetermined minimum value of the echo path attenuation value.
the third condition being such that a value calculated by subtracting a decibel value corresponding to the estimated power value of the near end background noise from a decibel value corresponding to the average power value of the transmitter input signal obtained through said first transmitter average power calculator is equal to or more than a predetermined threshold value.

11. The detector in accordance with claim 1, wherein said double-talk determiner gives an instruction of update of the coefficient where the average power value of the receiver input signal obtained through said first receiver average power calculator is equal to or higher than a predetermined threshold value, and a value calculated by subtracting a short-term average power value of the transmitter input signal obtained through said first transmitter average power calculator from the average power value of the receiver input signal obtained through said first receiver average power calculator to add a margin value thereto is larger than the estimated echo path attenuation value.

12. The detector in accordance with claim 3, wherein said attenuation value estimation calculator initializes itself to an initial value of the estimated echo path attenuation value by a predetermined minimum value of the echo path attenuation value.

13. The detector in accordance with claim 1, further comprising a rapid-power-increase detector for detecting a rapid increase in the signal power of the near end transmitter output signal based on the receiver input signal and the residual signal,
   said double-talk determiner controlling the update of the coefficient based on a result of detection from said rapid-power-increase detector.

14. The detector in accordance with claim 13, wherein said rapid-power-increase detector comprises:
   a first residual average power calculator for finding an average power value of the residual signal;
   a second residual average power calculator for finding an average power value of the residual signal for a shorter averaging calculation period of time than that of said first residual average power calculator;
   a first receiver average power calculator for finding an average power value of the receiver input signal; and
   a second receiver average power calculator for finding an average power value of the receiver input signal for a shorter averaging calculation period of time than that of said first receiver average power calculator.

15. The detector in accordance with claim 13, wherein
   said first residual average power calculator comprises a residual selector for selecting smaller one of average power values found by said first and second residual average power calculators,
   said first receiver average power calculator comprising a receiver selector for selecting smaller one of average power values found by said first and second receiver average power calculators.

16. The detector in accordance with claim 15, wherein said rapid-power-increase detector detects rapid increase in the near end transmitter output signal power where a value calculated by subtracting a value calculated by dividing very-short-term average power of the receiver input signal by average power of the receiver input signal from a value calculated by dividing very-short-term average power of the residual signal by average power of the residual signal is higher than a predetermined threshold value.

17. The detector in accordance with claim 13, wherein said rapid-power-increase detector controls to disable said attenuation value estimation calculator in response to detection of rapid increase in the near end transmitter output signal power.

* * * * *